United States Patent [19]

Shear et al.

[11] Patent Number: 6,157,721

[45] Date of Patent: Dec. 5, 2000

[54] SYSTEMS AND METHODS USING CRYPTOGRAPHY TO PROTECT SECURE COMPUTING ENVIRONMENTS

[75] Inventors: Victor H. Shear, Bethesda, Md.; W. Olin Sibert, Lexington, Mass.; David M. Van Wie, Sunnyvale, Calif.

[73] Assignee: InterTrust Technologies Corp., Santa Clara, Calif.

[21] Appl. No.: 08/689,754

[22] Filed: Aug. 12, 1996

[51] Int. Cl.$^7$ .............................. H04K 1/00; H04L 9/00; G06F 11/30

[52] U.S. Cl. ...................... 380/255; 380/251; 380/287; 713/155; 713/176; 713/180; 713/182; 713/194

[58] Field of Search ................................ 380/4, 23, 25, 380/49, 30, 255, 287, 251; 713/150–152, 155, 156, 164–170, 175–182, 189–191, 193, 200, 201, 194

[56] References Cited

U.S. PATENT DOCUMENTS

| | | |
|---|---|---|
| 3,573,747 | 4/1971 | Adams et al. . |
| 3,609,697 | 9/1971 | Blevins . |
| 3,796,830 | 3/1974 | Smith . |
| 3,798,359 | 3/1974 | Feistel . |
| 3,798,360 | 3/1974 | Feistel . |
| 3,798,605 | 3/1974 | Feistel . |
| 3,806,882 | 4/1974 | Clarke . |
| 3,829,833 | 8/1974 | Freeny, Jr. . |
| 3,906,448 | 9/1975 | Henriques . |
| 3,911,397 | 10/1975 | Freeny, Jr. . |
| 3,924,065 | 12/1975 | Freeny, Jr. . |
| 3,931,504 | 1/1976 | Jacoby . |
| 3,946,220 | 3/1976 | Brobeck et al. . |
| 3,956,615 | 5/1976 | Anderson et al. . |
| 3,958,081 | 5/1976 | Ehrsam et al. . |
| 3,970,992 | 7/1976 | Boothroyd et al. . |
| 4,048,619 | 9/1977 | Forman, Jr. et al. . |
| 4,071,911 | 1/1978 | Mazur . |
| 4,112,421 | 9/1978 | Freeny, Jr. . |
| 4,120,030 | 10/1978 | Johnstone . |
| 4,163,280 | 7/1979 | Mori et al. . |
| 4,168,396 | 9/1979 | Best . |
| 4,196,310 | 4/1980 | Forman et al. . |

(List continued on next page.)

FOREIGN PATENT DOCUMENTS

| | | |
|---|---|---|
| 9 004 79 | 12/1984 | Belgium . |
| 0 84 441 | 7/1983 | European Pat. Off. . |
| 0128672 | 12/1984 | European Pat. Off. . |

(List continued on next page.)

OTHER PUBLICATIONS

Applications Requirements for Innovative Programming; How to Foster (or Cripple) Program Development Opportunities for Interactive Video Programs Delivered on Optical Media; A Challenge for the Introduction of DVD (Digital Video Disc) (Oct. 19–20, 1995, Sheraton Universal Hotel, Universal City CA).

(List continued on next page.)

*Primary Examiner*—Stephen C. Buczinski
*Attorney, Agent, or Firm*—Finnegan, Henderson, Farabow, Garrett & Dunner, L.L.P.

[57] ABSTRACT

Secure computation environments are protected from bogus or rogue load modules, executables and other data elements through use of digital signatures, seals and certificates issued by a verifying authority. A verifying authority—which may be a trusted independent third party—tests the load modules or other executables to verify that their corresponding specifications are accurate and complete, and then digitally signs the load module or other executable based on tamper resistance work factor classification. Secure computation environments with different tamper resistance work factors use different verification digital signature authentication techniques (e.g., different signature algorithms and/or signature verification keys)—allowing one tamper resistance work factor environment to protect itself against load modules from another, different tamper resistance work factor environment. Several dissimilar digital signature algorithms may be used to reduce vulnerability from algorithm compromise, and subsets of multiple digital signatures may be used to reduce the scope of any specific compromise.

41 Claims, 15 Drawing Sheets

U.S. PATENT DOCUMENTS

| | | |
|---|---|---|
| 4,200,913 | 4/1980 | Kuhar et al. . |
| 4,209,787 | 6/1980 | Freeny, Jr. . |
| 4,217,588 | 8/1980 | Freeny, Jr. . |
| 4,220,991 | 9/1980 | Hamano et al. . |
| 4,232,193 | 11/1980 | Gerard . |
| 4,232,317 | 11/1980 | Freeny, Jr. . |
| 4,236,217 | 11/1980 | Kennedy . |
| 4,253,157 | 2/1981 | Kirschner et al. . |
| 4,262,329 | 4/1981 | Bright et al. . |
| 4,265,371 | 5/1981 | Desai et al. . |
| 4,270,182 | 5/1981 | Asija . |
| 4,278,837 | 7/1981 | Best . |
| 4,305,131 | 12/1981 | Best . |
| 4,306,289 | 12/1981 | Lumley . |
| 4,309,569 | 1/1982 | Merkle . |
| 4,319,079 | 3/1982 | Best . |
| 4,323,921 | 4/1982 | Guillou . |
| 4,328,544 | 5/1982 | Baldwin et al. . |
| 4,337,483 | 6/1982 | Guillou . |
| 4,361,877 | 11/1982 | Dyer et al. . |
| 4,375,579 | 3/1983 | Davida et al. . |
| 4,433,207 | 2/1984 | Best . |
| 4,434,464 | 2/1984 | Suzuki et al. . |
| 4,442,486 | 4/1984 | Mayer . |
| 4,446,519 | 5/1984 | Thomas . |
| 4,454,594 | 6/1984 | Heffron et al. . |
| 4,458,315 | 7/1984 | Uchenick . |
| 4,462,076 | 7/1984 | Smith, III . |
| 4,462,078 | 7/1984 | Ross . |
| 4,465,901 | 8/1984 | Best . |
| 4,471,163 | 9/1984 | Donald et al. . |
| 4,484,217 | 11/1984 | Block et al. . |
| 4,494,156 | 1/1985 | Kadison et al. . |
| 4,513,174 | 4/1985 | Herman . |
| 4,528,588 | 7/1985 | Lofberg . |
| 4,528,643 | 7/1985 | Freeny, Jr. . |
| 4,553,252 | 11/1985 | Egendorf . |
| 4,558,176 | 12/1985 | Arnold et al. . |
| 4,558,413 | 12/1985 | Schmidt et al. . |
| 4,562,306 | 12/1985 | Chou et al. . |
| 4,562,495 | 12/1985 | Bond et al. . |
| 4,577,289 | 3/1986 | Comerford et al. . |
| 4,584,641 | 4/1986 | Guglielmino . |
| 4,588,991 | 5/1986 | Atalla . |
| 4,589,064 | 5/1986 | Chiba et al. . |
| 4,593,183 | 6/1986 | Fukatsu . |
| 4,593,353 | 6/1986 | Pickholtz . |
| 4,593,376 | 6/1986 | Volk . |
| 4,595,950 | 6/1986 | Lofberg . |
| 4,597,058 | 6/1986 | Izumi et al. . |
| 4,634,807 | 1/1987 | Chorley et al. . |
| 4,644,493 | 2/1987 | Chandra et al. . |
| 4,646,234 | 2/1987 | Tolman et al. . |
| 4,652,990 | 3/1987 | Pailen et al. . |
| 4,658,093 | 4/1987 | Hellman . |
| 4,670,857 | 6/1987 | Rackman . |
| 4,672,572 | 6/1987 | Alsberg . |
| 4,677,434 | 6/1987 | Fascenda . |
| 4,680,731 | 7/1987 | Izumi et al. . |
| 4,683,553 | 7/1987 | Mollier . |
| 4,685,056 | 8/1987 | Barnsdale et al. . |
| 4,688,169 | 8/1987 | Joshi . |
| 4,691,350 | 9/1987 | Kleijne et al. . |
| 4,696,034 | 9/1987 | Wiedemer . |
| 4,701,846 | 10/1987 | Ikeda et al. . |
| 4,712,238 | 12/1987 | Gilhousen et al. . |
| 4,713,753 | 12/1987 | Boebert et al. . |
| 4,740,890 | 4/1988 | William . |
| 4,747,139 | 5/1988 | Taaffe . |
| 4,757,533 | 7/1988 | Allen et al. . |
| 4,757,534 | 7/1988 | Matyas et al. . |
| 4,768,087 | 8/1988 | Taub et al. . |
| 4,791,565 | 12/1988 | Dunham et al. . |
| 4,796,181 | 1/1989 | Wiedemer . |
| 4,799,156 | 1/1989 | Shavit et al. . |
| 4,807,288 | 2/1989 | Ugon et al. . |
| 4,817,140 | 3/1989 | Chandra et al. . |
| 4,823,264 | 4/1989 | Deming . |
| 4,827,508 | 5/1989 | Shear . |
| 4,858,121 | 8/1989 | Barber et al. . |
| 4,864,494 | 9/1989 | Kobus . |
| 4,868,877 | 9/1989 | Fischer . |
| 4,903,296 | 2/1990 | Chandra et al. . |
| 4,924,378 | 5/1990 | Hershey et al. . |
| 4,930,073 | 5/1990 | Cina, Jr. ............................... 380/23 X |
| 4,949,187 | 8/1990 | Cohen . |
| 4,977,594 | 12/1990 | Shear . |
| 4,999,806 | 3/1991 | Chernow et al. . |
| 5,001,752 | 3/1991 | Fischer . |
| 5,005,122 | 4/1991 | Griffin et al. . |
| 5,005,200 | 4/1991 | Fischer . |
| 5,010,571 | 4/1991 | Katznelson . |
| 5,023,907 | 6/1991 | Johnson et al. . |
| 5,047,928 | 9/1991 | Wiedemer . |
| 5,048,085 | 9/1991 | Abraham et al. . |
| 5,050,213 | 9/1991 | Shear . |
| 5,091,966 | 2/1992 | Bloomberg et al. . |
| 5,103,392 | 4/1992 | Mori . |
| 5,103,476 | 4/1992 | Waite et al. . |
| 5,111,390 | 5/1992 | Ketcham . |
| 5,119,493 | 6/1992 | Janis et al. . |
| 5,126,936 | 6/1992 | Champion et al. . |
| 5,128,525 | 7/1992 | Stearns et al. . |
| 5,136,643 | 8/1992 | Fischer . |
| 5,136,646 | 8/1992 | Haber et al. . |
| 5,136,647 | 8/1992 | Haber et al. . |
| 5,136,716 | 8/1992 | Harvey et al. . |
| 5,146,575 | 9/1992 | Nolan, Jr. . |
| 5,148,481 | 9/1992 | Abraham et al. . |
| 5,155,680 | 10/1992 | Wiedemer . |
| 5,168,147 | 12/1992 | Bloomberg . |
| 5,185,717 | 2/1993 | Mori . |
| 5,201,046 | 4/1993 | Goldberg et al. . |
| 5,201,047 | 4/1993 | Maki et al. . |
| 5,208,748 | 5/1993 | Flores et al. . |
| 5,214,702 | 5/1993 | Fischer . |
| 5,216,603 | 6/1993 | Flores et al. . |
| 5,221,833 | 6/1993 | Hecht . |
| 5,222,134 | 6/1993 | Waite et al. . |
| 5,224,160 | 6/1993 | Paulini et al. . |
| 5,224,163 | 6/1993 | Gasser et al. . |
| 5,235,642 | 8/1993 | Wobber et al. . |
| 5,241,671 | 8/1993 | Reed et al. . |
| 5,245,165 | 9/1993 | Zhang . |
| 5,247,575 | 9/1993 | Sprague et al. . |
| 5,260,999 | 11/1993 | Wyman . |
| 5,263,158 | 11/1993 | Janis . |
| 5,265,164 | 11/1993 | Matyas et al. . |
| 5,276,735 | 1/1994 | Boebert et al. . |
| 5,280,479 | 1/1994 | Mary . |
| 5,285,494 | 2/1994 | Sprecher et al. . |
| 5,301,231 | 4/1994 | Abraham et al. . |
| 5,311,591 | 5/1994 | Fischer . |
| 5,319,705 | 6/1994 | Halter et al. . |
| 5,335,169 | 8/1994 | Chong . |
| 5,337,360 | 8/1994 | Fischer . |
| 5,341,429 | 8/1994 | Stringer et al. . |
| 5,343,527 | 8/1994 | Moore . |
| 5,347,579 | 9/1994 | Blandford . |
| 5,351,293 | 9/1994 | Michener et al. . |
| 5,355,474 | 10/1994 | Thuraisngham et al. . |
| 5,373,440 | 12/1994 | Cohen et al. . |

| | | |
|---|---|---|
| 5,373,561 | 12/1994 | Haber et al. . |
| 5,390,247 | 2/1995 | Fischer . |
| 5,390,330 | 2/1995 | Talati . |
| 5,392,220 | 2/1995 | van den Hamer et al. . |
| 5,392,390 | 2/1995 | Crozier . |
| 5,394,469 | 2/1995 | Nagel et al. . |
| 5,410,598 | 4/1995 | Shear . |
| 5,412,717 | 5/1995 | Fischer . |
| 5,418,713 | 5/1995 | Allen . |
| 5,421,006 | 5/1995 | Jablon . |
| 5,422,953 | 6/1995 | Fischer . |
| 5,428,606 | 6/1995 | Moskowitz . |
| 5,438,508 | 8/1995 | Wyman . |
| 5,442,645 | 8/1995 | Ugon . |
| 5,444,779 | 8/1995 | Daniele . |
| 5,449,895 | 9/1995 | Hecht et al. . |
| 5,449,896 | 9/1995 | Hecht et al. . |
| 5,450,493 | 9/1995 | Maher . |
| 5,453,601 | 9/1995 | Rosen . |
| 5,453,605 | 9/1995 | Hecht et al. . |
| 5,455,407 | 10/1995 | Rosen . |
| 5,455,861 | 10/1995 | Faucher et al. . |
| 5,455,953 | 10/1995 | Russell . |
| 5,457,746 | 10/1995 | Dolphin . |
| 5,458,494 | 10/1995 | Krohn et al. . |
| 5,463,565 | 10/1995 | Cookson et al. . |
| 5,473,687 | 12/1995 | Lipscomb et al. . |
| 5,473,692 | 12/1995 | Davis . |
| 5,479,509 | 12/1995 | Ugon . |
| 5,485,622 | 1/1996 | Yamaki . |
| 5,491,800 | 2/1996 | Goldsmith et al. . |
| 5,497,479 | 3/1996 | Hornbuckle . |
| 5,497,491 | 3/1996 | Mitchell et al. . |
| 5,499,298 | 3/1996 | Narasimhalu et al. . |
| 5,504,757 | 4/1996 | Cook et al. . |
| 5,504,818 | 4/1996 | Okano . |
| 5,504,837 | 4/1996 | Griffeth et al. . |
| 5,508,913 | 4/1996 | Yamamoto et al. . |
| 5,509,070 | 4/1996 | Schull . |
| 5,513,261 | 4/1996 | Maher . |
| 5,530,235 | 6/1996 | Stefik et al. . |
| 5,530,752 | 6/1996 | Rubin . |
| 5,533,123 | 7/1996 | Force et al. . |
| 5,534,975 | 7/1996 | Stefik et al. . |
| 5,535,322 | 7/1996 | Hecht . |
| 5,537,526 | 7/1996 | Anderson et al. . |
| 5,539,735 | 7/1996 | Moskowitz . |
| 5,539,828 | 7/1996 | Davis . |
| 5,550,971 | 8/1996 | Brunner et al. . |
| 5,553,282 | 9/1996 | Parrish et al. . |
| 5,557,518 | 9/1996 | Rosen . |
| 5,563,946 | 10/1996 | Cooper et al. . |
| 5,568,552 | 10/1996 | Davis . |
| 5,572,673 | 11/1996 | Shurts . |
| 5,592,549 | 1/1997 | Nagel et al. . |
| 5,606,609 | 2/1997 | Houser et al. . |
| 5,613,004 | 3/1997 | Cooperman et al. . |
| 5,621,797 | 4/1997 | Rosen . |
| 5,629,980 | 5/1997 | Stefik et al. . |
| 5,633,932 | 5/1997 | Davis et al. . |
| 5,634,012 | 5/1997 | Stefik et al. . |
| 5,636,292 | 6/1997 | Rhoads . |
| 5,638,443 | 6/1997 | Stefik . |
| 5,638,504 | 6/1997 | Scott et al. . |
| 5,640,546 | 6/1997 | Gopinath et al. . |
| 5,655,077 | 8/1997 | Jones et al. . |
| 5,687,236 | 11/1997 | Moskowitz et al. . |
| 5,689,587 | 11/1997 | Bender et al. . |
| 5,692,047 | 11/1997 | McManis . |
| 5,692,180 | 11/1997 | Lee . |
| 5,710,834 | 1/1998 | Rhoads . |
| 5,715,403 | 2/1998 | Stefik . |
| 5,732,398 | 3/1998 | Tagawa . |
| 5,740,549 | 4/1998 | Reilly et al. . |
| 5,745,604 | 4/1998 | Rhoads . |
| 5,748,763 | 5/1998 | Rhoads . |
| 5,748,783 | 5/1998 | Rhoads . |
| 5,748,960 | 5/1998 | Fischer . |
| 5,754,849 | 5/1998 | Dyer et al. . |
| 5,757,914 | 5/1998 | McManis .................................. 380/23 |
| 5,758,152 | 5/1998 | LeTourneau . |
| 5,765,152 | 6/1998 | Erickson . |
| 5,768,426 | 6/1998 | Rhoads . |
| 5,774,872 | 6/1998 | Golden et al. . |
| 5,819,263 | 10/1998 | Bromley et al. . |
| 5,842,173 | 11/1998 | Strum et al. . |

FOREIGN PATENT DOCUMENTS

| | | |
|---|---|---|
| 0135422 | 3/1985 | European Pat. Off. . |
| 0180460 | 5/1986 | European Pat. Off. . |
| 0 370 146 | 11/1988 | European Pat. Off. . |
| 0399822A2 | 11/1990 | European Pat. Off. . |
| 0421409A2 | 4/1991 | European Pat. Off. . |
| 0 456 386 A2 | 11/1991 | European Pat. Off. . |
| 0 469 864 A2 | 2/1992 | European Pat. Off. . |
| 0 565 314 A2 | 10/1993 | European Pat. Off. . |
| 0 593 305 A2 | 4/1994 | European Pat. Off. . |
| 0 651 554 A1 | 5/1995 | European Pat. Off. . |
| 0 668 695 A2 | 8/1995 | European Pat. Off. . |
| 0 695 985 A1 | 2/1996 | European Pat. Off. . |
| 0 696 798 A1 | 2/1996 | European Pat. Off. . |
| 0715243A1 | 6/1996 | European Pat. Off. . |
| 0715244A1 | 6/1996 | European Pat. Off. . |
| 0715245A1 | 6/1996 | European Pat. Off. . |
| 0715246A1 | 6/1996 | European Pat. Off. . |
| 0715247A1 | 6/1996 | European Pat. Off. . |
| 0 725 376 | 8/1996 | European Pat. Off. . |
| 0749081A1 | 12/1996 | European Pat. Off. . |
| 0 778 513 A2 | 6/1997 | European Pat. Off. . |
| 0 795 873 A2 | 9/1997 | European Pat. Off. . |
| 3803982A1 | 1/1990 | Germany . |
| 57-726 | 5/1982 | Japan . |
| 62-241061 | 10/1987 | Japan . |
| 1-068835 | 3/1989 | Japan . |
| 64-68835 | 3/1989 | Japan . |
| 2-242352 | 9/1990 | Japan . |
| 2-247763 | 10/1990 | Japan . |
| 2-294855 | 12/1990 | Japan . |
| 4-369068 | 12/1992 | Japan . |
| 5-181734 | 7/1993 | Japan . |
| 5-257783 | 10/1993 | Japan . |
| 5-268415 | 10/1993 | Japan . |
| 6-175794 | 6/1994 | Japan . |
| 6-215010 | 8/1994 | Japan . |
| 6225059 | 8/1994 | Japan . |
| 7-056794 | 3/1995 | Japan . |
| 7-084852 | 3/1995 | Japan . |
| 7-141138 | 6/1995 | Japan . |
| 7-200317 | 8/1995 | Japan . |
| 7-200492 | 8/1995 | Japan . |
| 7-244639 | 9/1995 | Japan . |
| 8-137795 | 5/1996 | Japan . |
| 8-152990 | 6/1996 | Japan . |
| 8-185298 | 7/1996 | Japan . |
| 2136175 | 9/1984 | United Kingdom . |
| 2264796A | 9/1993 | United Kingdom . |
| 2294348 | 4/1996 | United Kingdom . |
| 2295947 | 6/1996 | United Kingdom . |
| WO A8502310 | 5/1985 | WIPO . |
| WO 85/03584 | 8/1985 | WIPO . |
| WO 90/02382 | 3/1990 | WIPO . |
| WO 92/06438 | 4/1992 | WIPO . |
| WO 92/22870 | 12/1992 | WIPO . |

| | | |
|---|---|---|
| WO 93/01550 | 1/1993 | WIPO . |
| WO 94/01821 | 1/1994 | WIPO . |
| WO 94/03859 | 2/1994 | WIPO . |
| WO 94/06103 | 3/1994 | WIPO . |
| WO 94/16395 | 7/1994 | WIPO . |
| WO 94/18620 | 8/1994 | WIPO . |
| WO 94/22266 | 9/1994 | WIPO . |
| WO 94/27406 | 11/1994 | WIPO . |
| WO95/14289 | 5/1995 | WIPO . |
| WO 96/00963 | 1/1996 | WIPO . |
| WO 96/03835 | 2/1996 | WIPO . |
| WO 96/05698 | 2/1996 | WIPO . |
| WO 96/06503 | 2/1996 | WIPO . |
| WO 96/13013 | 5/1996 | WIPO . |
| WO 96/21192 | 7/1996 | WIPO . |
| WO 97/03423 | 1/1997 | WIPO . |
| WO97/07656 | 3/1997 | WIPO . |
| WO97/32251 | 9/1997 | WIPO . |
| WO 97/48203 | 12/1997 | WIPO . |

OTHER PUBLICATIONS

Argent Information Q&A Sheet, http://www.digital–watermark.com/, Copyright 1995, The DICE Company, 7 pages.

Arneke, David, et al., News Release, AT&T, Jan. 9, 1995, AT&T encryption system protects information services, 1 page.

*AT&T Technology,* vol. 9, No. 4, New Products, Systems and Services, pp. 16–19.

Baggett, Claude, Cable's Emerging Role in the Information Superhighway, Cable Labs, 13 slides.

Barassi, Theodore Sedgwick, Esq., The Cybernotary: Public Key Registration and Certification and Authentication of International Legal Transactions, 4 pages.

Barnes, Hugh, memo to Henry LaMuth, subject: George Gilder articles, May 31, 1994.

Bart, Dan, Comments in the Matter of Public Hearing and Request for Comments on the International Aspects of the National Information Infrastructure, Aug. 12, 1994.

Baum, Michael, Worldwide Electronic Commerce: Law, Policy and Controls Conference, program details, Nov. 11, 1993.

Bisbey, II et al., Encapsulation: An Approach to Operating System Security, Oct. 1973, pp. 666–675.

Blom et al., Encryption Methods in Data Networks, Ericsson Technics, No. 2, 1978, Stockholm, Sweden.

Bruner, Rick E., PowerAgent, NetBot help advertisers reach Internet shoppers, Aug. 1997 (Document from Internet).

Cable Television and America's Telecommunications Infrastructure, National Cable Television Association, Apr. 1993.

Caruso, Technology, Digital Commerce 2 plans for watermarks, which can bind proof of authorship to electronic works, New York Times (Aug. 1995).

CD ROM, Introducing . . . The Workflow CD–ROM Sampler, Creative Networks, MCIMail: Creative Networks, Inc., Pala Alto, California.

Choudhury, et al., Copyright Protection for Electronic Publishing over Computer Networks, AT&T Bell.

Laboratores, Murray Hill, New Jersey 07974 (Jun. 1994).

Clark, Tim, Ad service gives cash back, www.news.com, Aug. 4, 1997, 2 pages (Document from Internet).

Codercard, Spec Sheet—Basic Coder Subsystem, No date given.

Communications of the ACM, Intelligent Agents, Jul. 1994, vol. 37, No. 7.

Communications of the ACM, Jun. 1996, vol. 39, No. 6.

Computer Systems Policy Project (CSSP), Perspectives on the National Information Infrastructure: Ensuring Interoperability (Feb. 1994), February 1994.

Cunningham, Donna, et al., News Release, AT&T, Jan. 31, 1995, AT&T, VLSI Technology join to improve info highway security, 3 pages.

Data Sheet, About the Digital Notary Service, Surety Technologies, Inc., 1994–95, 6 pages.

Dempsey, et al., *D–Lib Magazine,* Jul./Aug. 1996 The Warwick Metadata Workshop: A Framework for the Deployment of Resource Description, Jul. 15, 1966.

Denning et al., Data Security, 11 Computing Surveys No. 3, Sep. 1979.

Diffie, Whitfield and Martin E. Hellman, IEEE Transactions on Information Theory, vol. 22, No. 6, Nov. 1976, New Directions in Cryptography, pp. 644–651.

Diffie, Whitfield and Martin E. Hellman, Proceedings of the IEEE, vol. 67, No. 3, Mar. 1979, Privacy and Authentication: An Introduction to Cryptography, pp. 397–427.

Digest of Papers, VLSI: New Architectural Horizons, Feb. 1980, Preventing Software Piracy With Crypto–Microprocessors, Robert M. Best, pp. 466–469.

*DiscStore* (Electronic Publishing Resources 1991).

Document from Internet, cgi@ncsa.uiuc.edu, CGI Common Gateway Interface, 1 page, 1996.

DSP56000/DSP56001 Digital Signal Processor User's Manual, Motorola, 1990, pp. 2–2.

Dusse, Stephen R. and Burton S. Kaliski A Cryptographic Library for the Motorola 56000 in Damgard, I.M., Advances in Cryptology—Proceedings Eurocrypt 90, Springer–Verlag, 1991, pp. 230–244.

Dyson, Esther, Intellectual Value, Wired Magazine, Jul. 1995, pp. 136–141 and 182–184.

Effector Online vol. 6 No. 6, A Publication of the Electronic Frontier Foundation, 8 pages, Dec. 6, 1993.

EIA and TIA White Paper on National Information Infrastructure,published by the Electronic Industries Association and the Telecommunications Industry Association, Washington, D.C., no date.

Electronic Currency Requirements, XIWT (Cross Industry Working Group), no date.

Electronic Publishing Resources Inc. Protecting Electronically Published Properties Increasing Publishing Profits (Electronic Publishing Resources 1991).

Firefly Network, Inc., www.ffly.com, What is Firefly? Firefly revision: 41.4 Copyright 1995, 1996.

First CII Honeywell Bull International Symposium on Computer Security and Confidentiality, Jan. 26–28, 1981, Conference Text, pp. 1–21.

Framework for National Information Infrastructure Services, Draft, U.S. Department of Commerce, Jul. 1994.

Framework for National Information Infrastructure Services, NIST, Jul. 1994, 12 slides.

Garcia, D. Linda, testimony before a hearing on science, space and technology, May 26, 1994.

Gleick, James, "Dead as a Dollar" *The New York Times Magazine,* Jun. 16, 1996, Section 6, pp. 26–30, 35, 42, 50, 54.

Green paper, Intellectual Property and the National Information Infrastructure, a Preliminary Draft of the Report of the Working Group on Intellectual Property Rights, Jul. 1994.

Greguras, Fred, Softic Symposium '95, Copyright Clearances and Moral Rights, Nov. 30, 1995 (as updated Dec. 11, 1995), 3 pages.

Guillou, L.: Smart Cards and Conditional Access, pp. 480–490 Advances in Cryptography, Proceedings of Euro-Crypt 84 (Beth et al, Ed., Springer–Verlag 1985).

Harman, Harry H., *Modern Factor Analysis,* Third Edition Revised, University of Chicago Press Chicago and London, Third revision published 1976.

Herzberg, Amir et al., Public Protection of Software, *ACM Transactions on Computer Systems,* vol. 5, No. 4, Nov. 1987, pp. 371–393.

Hofmann, Jud, Interfacing the NII to User Homes, Electronic Industries Association, Consumer Electronic Bus Committee, 14 slides, no date.

Holt, Stannie, Start–up promises user confidentiality in Web marketing service, Info World Electric, Aug. 13, 1997 (Document from Internet).

IBM Technical Disclosure Bulletin, Multimedia Mixed Object Envelopes Supporting a Graduated Fee Scheme via Encryption, vol. 37, No. 03, Mar. 1994, Armonk, NY.

IBM Technical Disclosure Bulletin, Transformer Rules for Software Distribution Mechanism—Support Products, vol. 37, No. 04B, Arp. 1994, Armonk, NY.

IISP Break Out Session Report for Group No. 3, Standards Development and Tracking Systems, no date.

Information Infrastructure Standards Panel: NII 'The Information Superhighway', Nations Bank—HGDeal—ASC X9, 15 pages.

Invoice? What is an Invoice? *Business Week,* Jun. 10, 1996.

Jiang, et al, A concept–Based Approach to Retrieval from an Electronic Industrialn Directory, *International Journal of Electronic Commerce,* vol. 1, No. 1, Fall 1996, pp. 51–72.

Jones, Debra, Top Tech Stories, PowerAgent Introduces First Internet 'Infomediary' to Empower and Protect Consumers, Aug. 13, 1997 3 pages (Document from Internet).

Kelly, Kevin, Whole Earth Review, E–Money,pp. 40–59, Summer 1993.

Kent, Protecting Externally Supplied Software In Small Computers (MIT/LCS/TR–255 Sep. 1980).

Kohntopp, M., Sag's durch die Blume, Apr. 1996, marit@schulung.netuse.de.

Kristol et al., Anonymous Internet Mercantile Protocol, AT&T Bell Laboratories, Murray Hill, New Jersey, Draft: Mar. 17, 1994.

Lagoze, Carl, *D–Lib Magazine,* Jul./Aug. 1996, The Warwick Framework, A Container Architecture for Diverse Sets of Metadata.

Lanza, Mike, electronic mail, George Gilder's Fifth Article—Digital Darkhorse—Newspapers, Feb. 21, 1994.

Levy, Steven, Wired, E–Money, That's What I Want, 10 pages, Dec. 1994.

Low et al., Anonymous Credit Cards and its Collusion Analysis, AT&T Bell Laboratories, Murray Hill, New Jersey, Oct. 10, 1994.

Low et al., Anonymous Credit Cards, AT&T Bell Laboratories, Proceedings of the 2nd ACM Conference on Computer and Communications Security, Fairfax, Virginia, Nov. 2–4, 1994.

Low et al., Document Marking and Identification using both Line and Word Shifting, AT&T Bell Laboratories, Murray Hill, New Jersey, Jul. 29, 1994.

Maclachlan, Malcolm, PowerAgent Debuts Spam–Free Marketing, *TechWire,* Aug. 13, 1997, 3 pages (Document from Internet).

Maxemchuk, Electronic Document Distribution, AT&T Bell Laboratories, Murray Hill, New Jersey 07974.

Micro Card—Micro Card Technologies, Inc., Dallas, Texas, No date given.

Milbrandt, E., Stenanography Info and Archive, 1996.

Mori, Ryoichi and Masaji Kawahara, The Transactions of the EIEICE, V, Superdistribution: The Concept and the Architecture, E73 (Jul. 1990), No. 7, Tokyo, Japan.

Mossberg, Walter S., Personal Technology, Threats to Privacy On–Line Become More Worrisome, *Wall Street Journal,* Oct. 24, 1996.

Negroponte, Electronic Word of Mouth, *Wired* Oct. 1996, p. 218.

Negroponte, Nicholas, Telecommunications, Some Thoughts on Likely and expected Communications scenarios: A Rebuttal, pp. 41–42, Jan. 1993.

Neumann, et al., A Provably Secure Operating System: The System, Its Applications, and Proofs, Computer Science Laboratory Report CSL–116, Second Edition, SRI International (May 1980).

News Release, Premenos Announces Templar 2.0—Next Generation Software for Secure Internet EDI, webmaster@templar.net, 1 page, Jan. 17, 1996.

News Release, The Document Company Xerox, Xerox Announces Software Kit for Creating Working Documents with Dataglyphs, Nov. 6, 1995, Minneapolis, MN, 13 pages.

News Release, The White House, Office of the President, Background on the Administration's Telecommunications Policy Reform Initiative, Jan. 11, 1994.

NII, Architecture Requirements, XIWT, no date.

Open System Environment Architectural Framework for National Information Infrastructure Services and Standards, in Support of National Class Distributed Systems, Distributed System Engineering Program Sponsor Group, Draft 1.0, Aug. 5, 1994.

Pelton, Dr. Joseph N., Telecommunications, Why Nicholas Negroponte is Wrong About the Future of Telecommunication, pp. 35–40, Jan. 1993.

Portland Software's ZipLock, Internet information, Copyright Portland Software 1996–1997, 12 pages.

PowerAgent Inc., Proper Use of Consumer Information on the Internet White Paper, Jun. 1997, Document from Internet, 9 pages (Document from Internet).

PowerAgent Press Releases, What the Experts are Reporting on PowerAgent, Aug. 13, 1997, 6 pages (Document from Internet).

PowerAgent Press Releases, What the Experts are Reporting on PowerAgent, Aug. 4, 1997, 5 pages (Document from Internet).

PowerAgent Press Releases, What the Experts are Reporting on PowerAgent, Aug. 13, 1997, 3 pages (Document from Internet).

Premenos Corp. White Paper: The Future of Electronic Commerce, A Supplement to Midrange Systems, Internet webmaster@premenos.com, 4 pages.

Press Release, National Semiconductor and EPR Partner For Information Metering/Data Security Cards (Mar. 4, 1994).

Rankine, G., Thomas—A Complete Single–Chip RSA Device, Advances in Cryptography, Proceedings of Crypto 86, pp. 480–487 (A.M. Odlyzko Ed., Springer–Verlag 1987).

Reilly, Arthur K., Standards committee T1–Telecommunications, Input to the 'International Telecommunications Hearings,' Panel 1: Component Technologies of the NII/GII, no date.

Resnick, et al., Recommender Systems, *Communications of the ACM,* vol. 40, No. 3, Mar. 1997, pp. 56–89.

ROI (Personal Library Software, 1987 or 1988).

ROI–Solving Critical Electronic Publishing Problems (Personal Library Software, 1987 or 1988).

Rose, Lance, Cyberspace and the Legal Matrix: Laws or Confusion?, 1991.

Rosenthal, Steve, New Media, Interactive Network: Viewers Get Involved, pp. 30–31, Dec. 1992.

Rosenthal, Steve, New Media, Interactive TV: The Gold Rush Is On, pp. 27–29, Dec. 1992.

Rosenthal, Steve, New Media, Mega Channels, pp. 36–46, Sep. 1993.

Rothstein, Edward, *The New York Times,* Technology, Connections, Making th eInternet come to you, through 'push' technology.. pp D5, Jan. 20, 1997.

Rutkowski, Ken, PowerAgent Introduces First Internet 'Infomediary' to Empower and Protect Consumers, Tech Talk News Story, Aug. 4, 1997 (Document from Internet).

Sager, Ira (Edited by), Bits & Bytes, *Business Week,* Sep. 23, 1996, p. 142E.

Schlossstein, Steven, International Economy, America: The G7's Comeback Kid, Jun./Jul. 1993.

Schurmann, Jurgen, *Pattern Classification, A Unified View of Statistical and Neural Approaches,* John Wiley & Sons, Inc., 1996.

Scnaumueller–Bichi et al., A Method of Software Protection Based on the Use of Smart Cards and Cryptographic Techniques, No date given.

Serving the Community: A Public–Interest Vision of the National Information Infrastructure, Computer Professionals for Social Responsibility, Executive Summary, no date.

Shear, Solutions for CD–ROM Pricing and Data Security Problems, pp. 530–533, *CD ROM Yearbook 1988–1989)* (Microsoft Press 1988 or 1989).

Smith et al., Signed Vector Timestamps: A Secure Protocol for Partial Order Time, CMU–93–116, School of Computer Science Carnegie Mellon University, Pittsburgh, Pennsylvania, Oct. 1991; version of February 1993.

Special Report, The Internet:Fulfulling the Promise The Internet: Bring Order From Chaos; Lynch, Clifford, Search the Internet; Resnick, Paul, Filtering Information on the Internet; Hearst, Marti A., Interfaces for Searching the Web; Stefik, Mark, Trusted Systems; *Scientific American,* Mar. 1997, pp. 49–56, 62–64, 68–72, 78–81.

Stefik, Internet Dreams: Archetypes, Myths, and Metaphors, Letting Loose the Light: Igniting Commerce in Electronic Publication, pp. 219–253, (1996) Massachusetts Institute of Technology.

Stefik, Mark, *Introduction to Knowledge Systems,* Chapter 7, Classification, pp 543–607, 1995 by Morgan Kaufmann Publishers, Inc.

Stefik, Mark, Letting Loose the Light, Igniting Commerce in Electronic Publication, (1994, 1995) Pala Alto, California.

Stephenson, Tom, Advanced Imaging, The Info Infrastructure Initiative: Data Superhighways and You, pp. 73–74, May 1993.

Sterling, Bruce, Literary freeware: Not for Commercial Use, remarks at Computers, Freedom and Privacy Conference IV, Chicago, Mar. 26, 1994.

Struif, Bruno The Use of Chipcards for Electronic Signatures and Encryption in: Proceedings for the 1989 Conference on VSLI and Computer Peripherals, IEEE Computer Society Press, 1989, pp. 4/155–4/158.

Suida, Karl, Mapping New Applications Onto New Technologies, Security Services in Telecommunications Networks, Mar. 8–10, 1988, Zurich.

Templar Overview,: Premenos, Internet info@templar.net, 4 pages.

Templar Software and Services: Secure, Reliable, Standards–Based EDI Over the Internet, Prementos, Internet info@templar.net, 1page.

The 1.1 Future of the Electronic Marketplace: Return to a Hunting and Gathering Society, 2 pages no date.

The Benefits of ROI For Database Protection and Usage Based Billing (Personal Library Software, 1987 or 1988).

The New Alexandria No. 1, Alexandria Institute, pp. 1–12, Jul.–Aug. 1986.

Tygar et al., Cryptography: It's Not Just For Electronic Mail Anymore, CMU–CS–93–107, School of Computer Science Carnegie Mellon University, Pittsburgh, Pennsylvania, Mar. 1, 1993.

Tygar et al., Dyad: A System Using Physically Secure Coprocessors, School of Computer Science, Carnegie Mellon University, Pittsburgh, PA 15213 (undated).

Tygar et al., Dyad: A System for Using Physically Secure Coprocessors, School of Computer Science, Carnegie Mellon University, Pittsburgh, PA 15213 (May. 1991).

Valovic T., Telecommunications, The Role of Computer Networking in the Emerging Virtual Marketplace, pp. 40–44.

Voight, Joan, Beyond the Banner, *Wired,* Dec. 1996, pp. 196, 200, 204.

Vonder Haar, Steven, PowerAgent Launches Commercial Service, Inter@ctive Week, Aug. 4, 1997 (Document from Internet).

Weber, Dr. Robert, Digital Rights Management Technologies, A Report to the International Federation of Reproduction Rights Organisations, Oct. 1995,pp 1–49.

Weber, Dr. Robert, Digital Rights Management Technologies, Oct. 1995, 21 pages.

Weber, Metering Technologies for Digital Intellectual Property, A Report to the International Federation of Reproduction Rights Organisations, pp 1–29; Oct. 1994, Boston, MA, USA.

Weber, Adele, Life on the InfoHighway, 4 pages, no date.

Weingart, Physical Security for the :ABYSS System, IBM Thomas J. Watson Research Center, Yorktown Heights, New York 10598 (1987).

Weitzner, Daniel J., A Statement on EFF's Open Platform Campaign as of Nov., 1993, 3 pages.

WEPIN Store, Stenography (Hidden Writing) (Common Law 1995).

White, ABYSS: A Trusted Architecture for Software Protection, IBM Thomas J. Watson Research Center, Yorktown Heights, New York 10598 (1987).

Wired 1.02, Is Advertising Really dead?, Part 2, 1994.

World Wide Web FAQ, How can I put an access counter on my home page?, 1 page, 1996.

XIWT Cross Industry Working Team, 5 pages, Jul. 1994.

Yee, Using Secure Coprocessors, CMU–CS–94–149, School of Computer Science, Carnegie Mellon University, Pittsburgh, PA15213.

FIG. 2 Verifying Load Modules

FIG. 3 Before Protected Processing Environment Uses A Load Module, It Checks To See If Load Module Has Been Verified

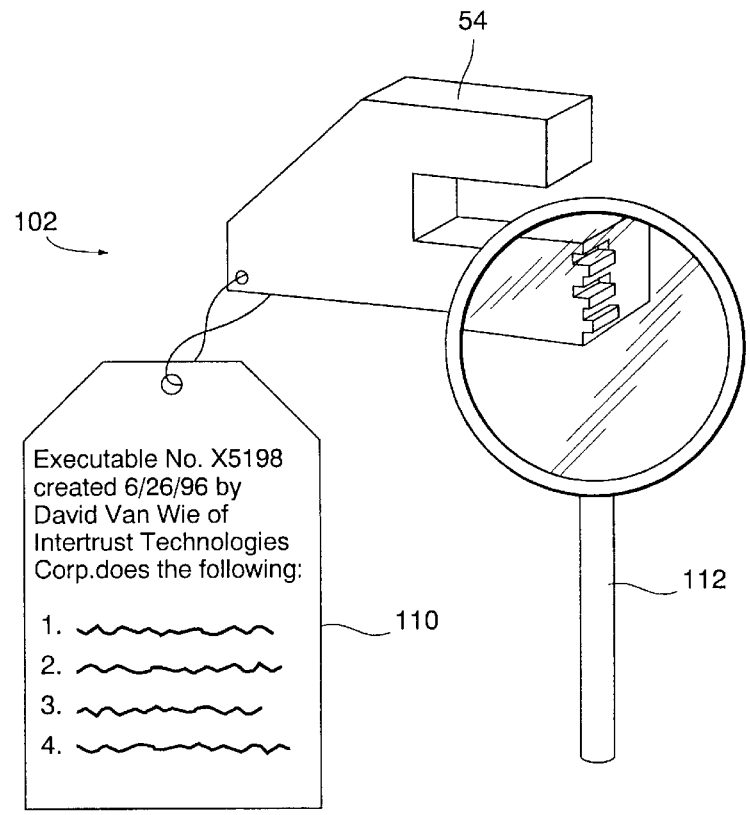
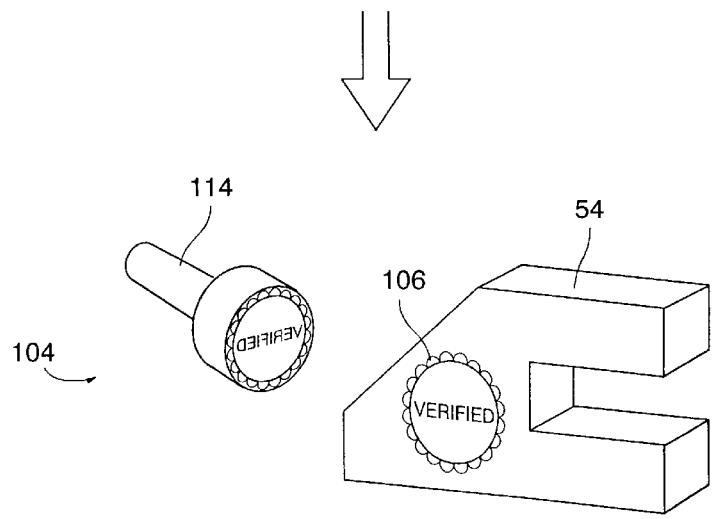
FIG. 4
Certifying Load Module by
Checking it Against its Documentation Creating a Certifying
Digital Signature

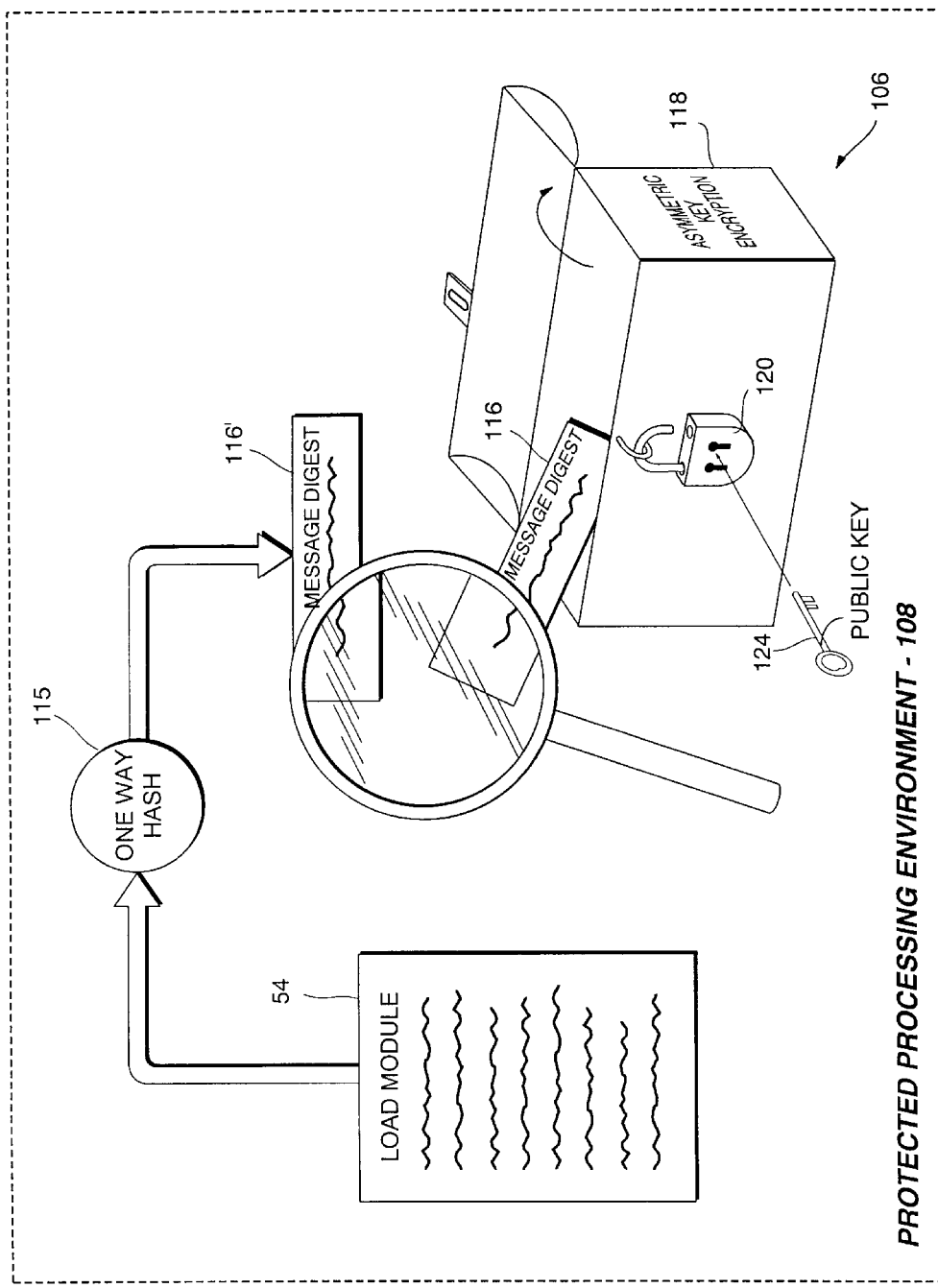
FIG. 6  Authenticating a Digital Signature

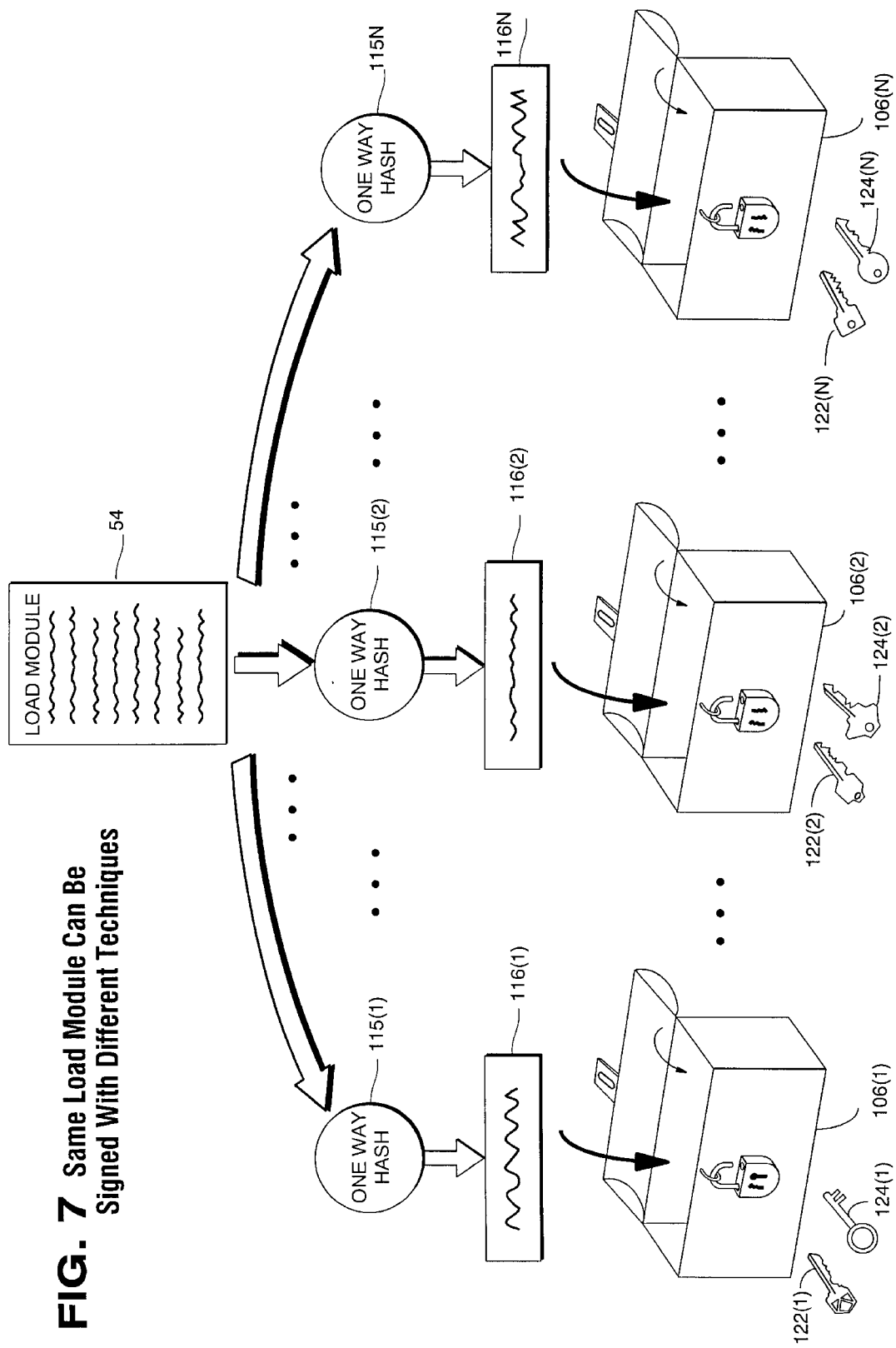
FIG. 7 Same Load Module Can Be Signed With Different Techniques

FIG. 8 Same Load Module Can Be Distributed with Multiple Signatures
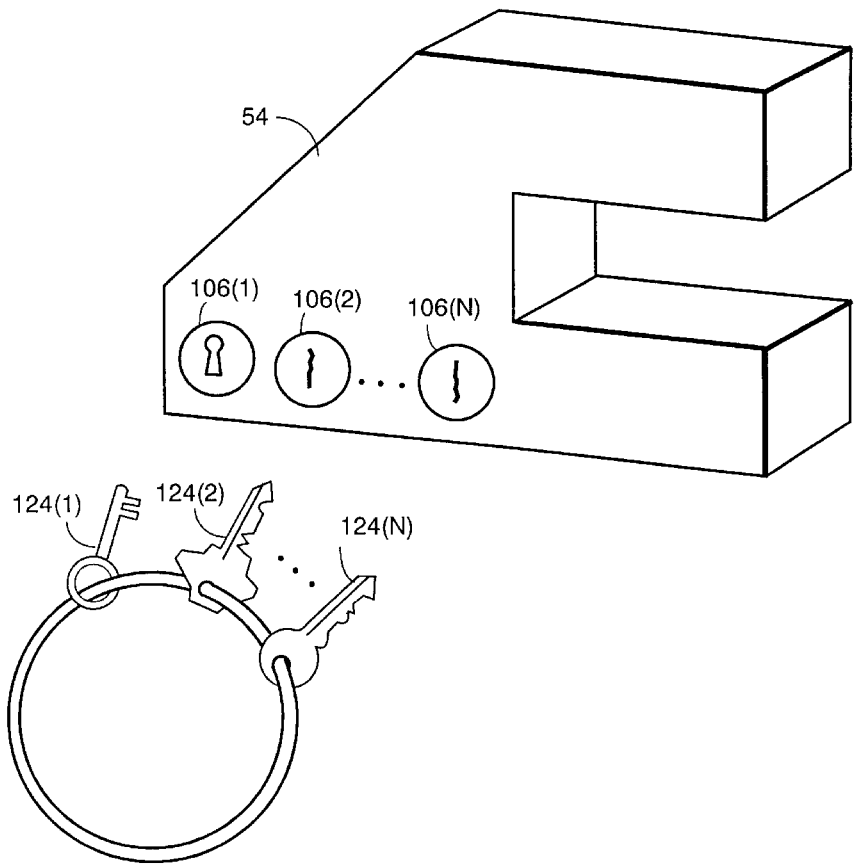
FIG. 8A Different Processing Environments Can Have Different Subsets of Keys
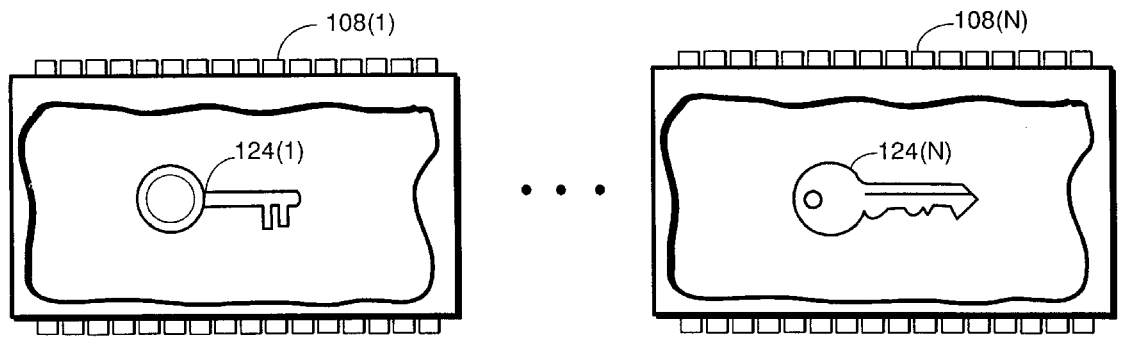

FIG. 9 Load Module Can Have Several Independently Signed Portions
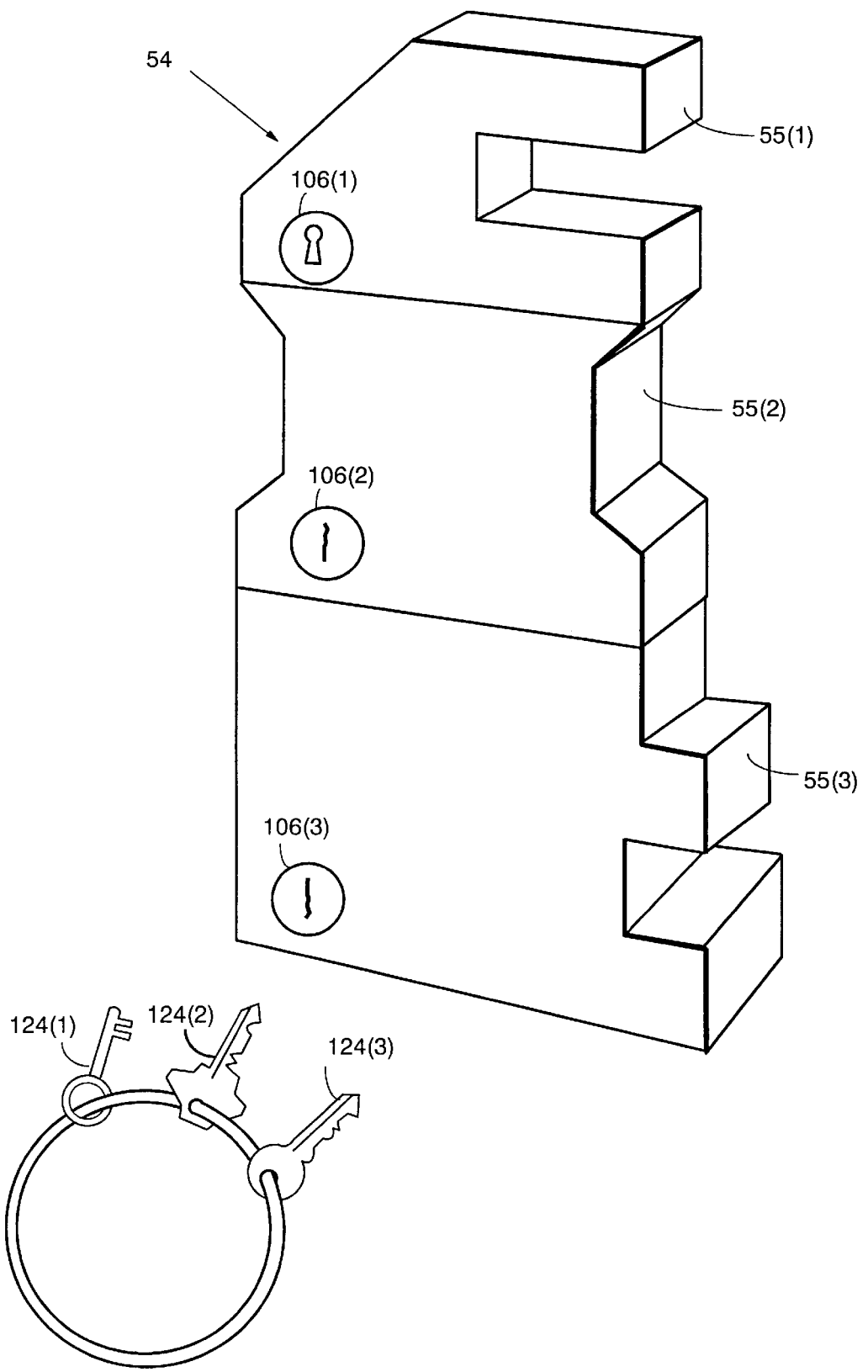

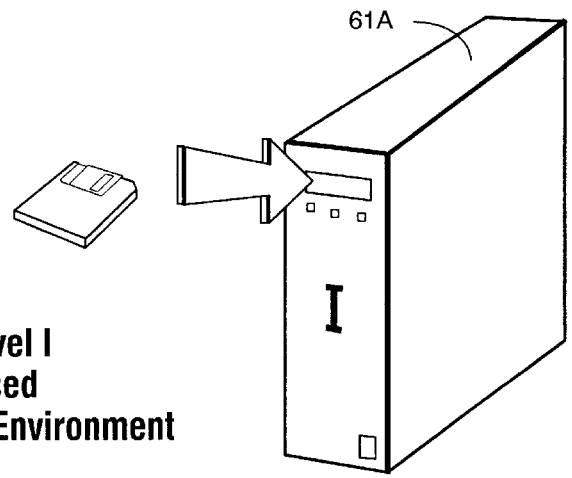
FIG. 10A Assurance Level I
Software-Based
Protected Processing Environment
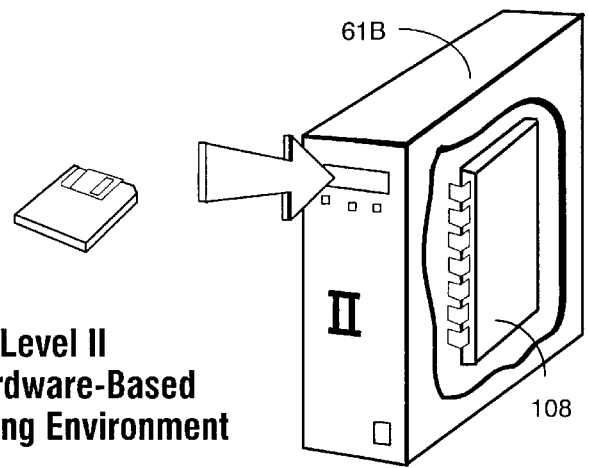
FIG. 10B Assurance Level II
Software and Hardware-Based
Protected Processing Environment
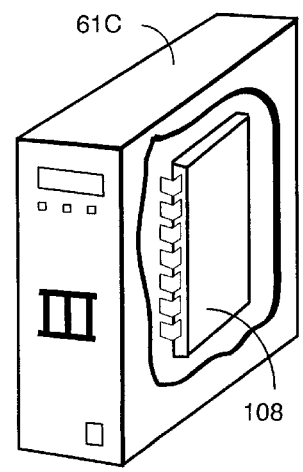
FIG. 10C Assurance Level III
Hardware-Based
Protected Processing Environment

FIG. 11A Level I
Digital Signature
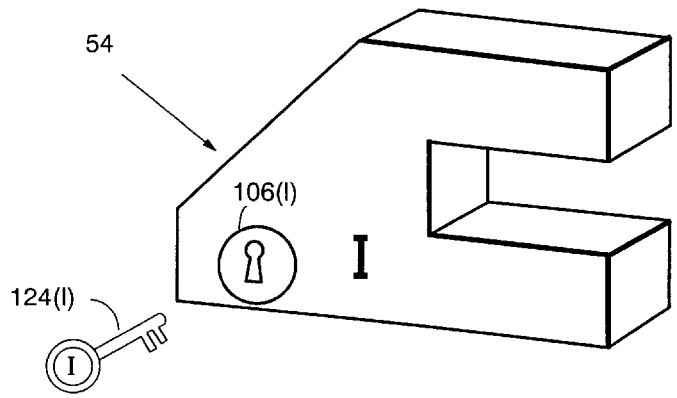
FIG. 11B Level II
Digital Signature
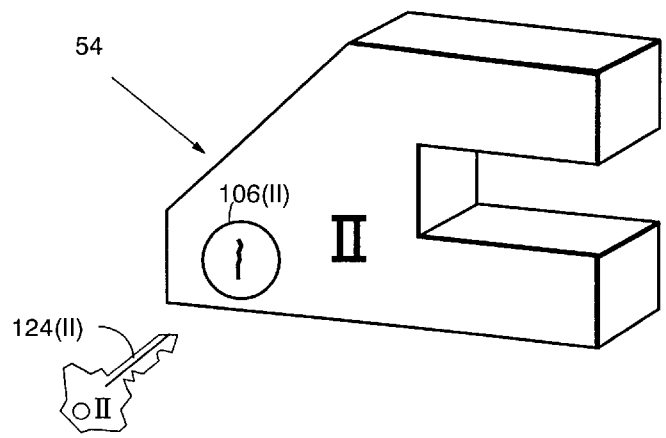
FIG. 11C Level III
Digital Signature
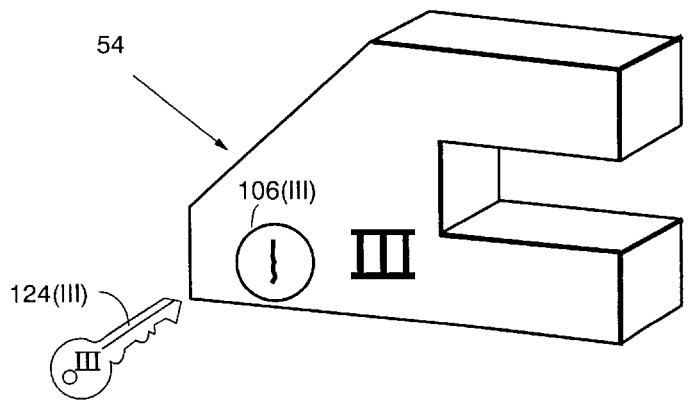

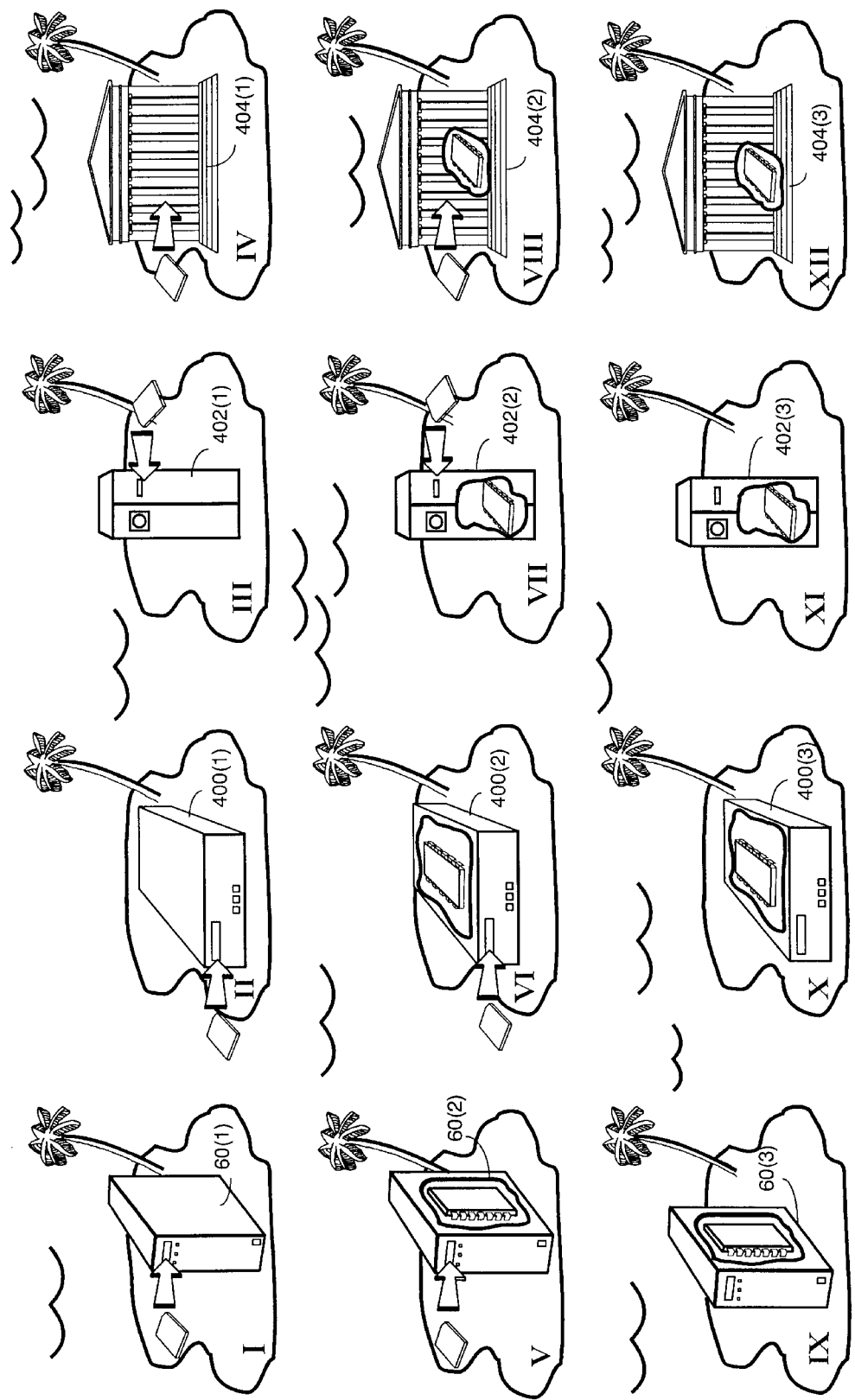
FIG. 12  Using Digital Signatures For Compartmentalizing Different Assurance Levels

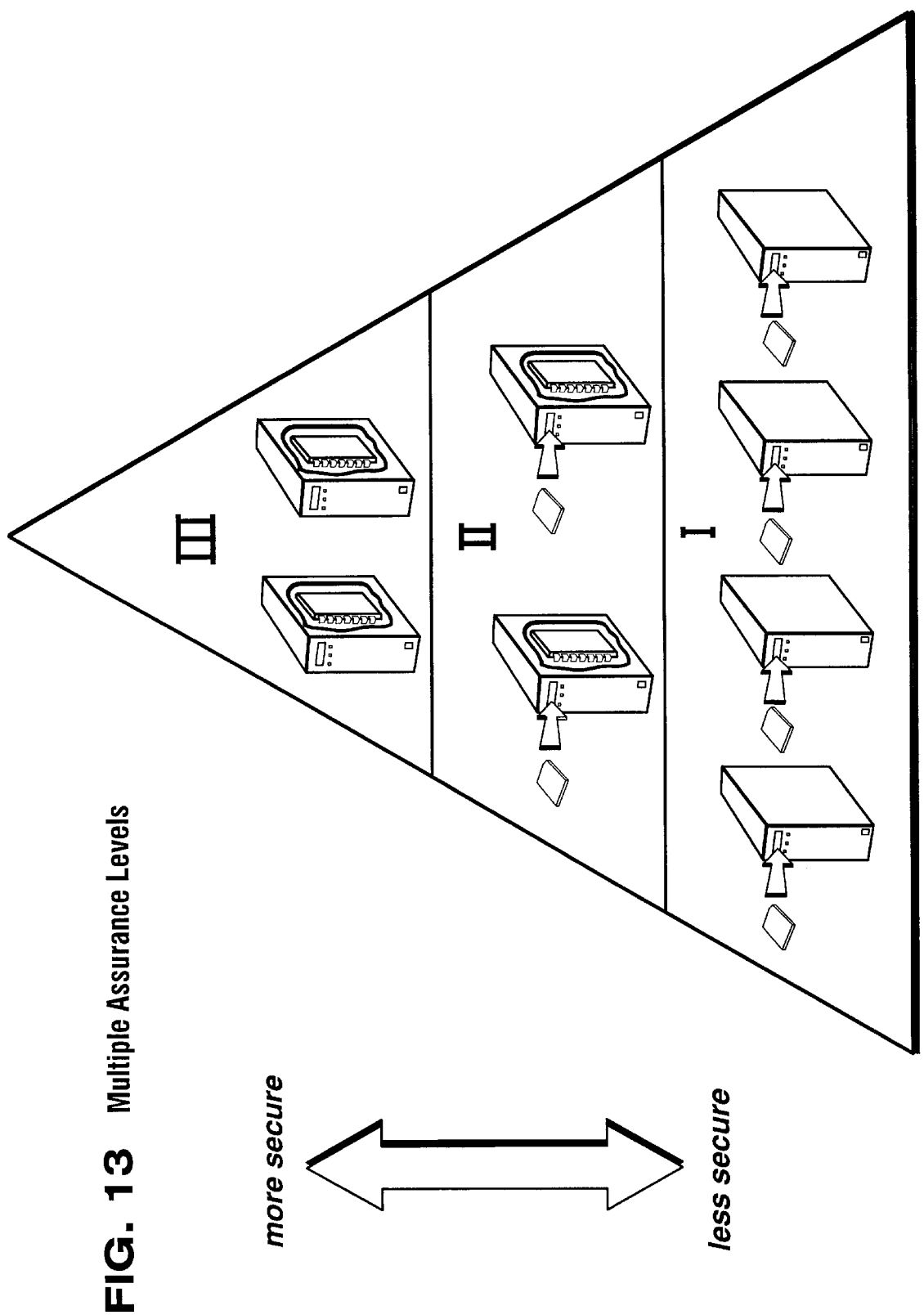
FIG. 13 Multiple Assurance Levels

6,157,721

SYSTEMS AND METHODS USING CRYPTOGRAPHY TO PROTECT SECURE COMPUTING ENVIRONMENTS

CROSS REFERENCE TO RELATED APPLICATION

This application is related to commonly assigned copending application Ser. No. 08/388,107 of Ginter et al., filed Feb. 13, 1995, entitled "SYSTEMS AND METHODS FOR SECURE TRANSACTION MANAGEMENT AND ELECTRONIC RIGHTS PROTECTION". We incorporate by reference, into this application, the entire disclosure of this prior-filed Ginter et al. patent application just as if its entire written specification and drawings were expressly set forth in this application.

FIELD OF THE INVENTION(S)

This invention relates to computer security, and more particularly to secure and/or protected computer execution environments. Still more specifically, the present invention relates to computer security techniques based at least in part on cryptography, that protect a computer processing environment against potentially harmful computer executables, programs and/or data; and to techniques for certifying load modules such as executable computer programs or fragments thereof as being authorized for use by a protected or secure processing environment.

BACKGROUND AND SUMMARY OF THE INVENTION(S)

Computers have become increasingly central to business, finance and other important aspects of our lives. It is now more important than ever to protect computers from "bad" or harmful computer programs. Unfortunately, since many of our most critical business, financial and governmental tasks now rely heavily on computers, dishonest people have a great incentive to use increasingly sophisticated and ingenious computer attacks.

Imagine, for example, if a dishonest customer of a major bank could reprogram the bank's computer so it adds to instead of subtracts from the customer's account—or diverts a penny to the customer's account from anyone else's bank deposit in excess of $10,000. If successful, such attacks would not only allow dishonest people to steal, but could also undermine society's confidence in the integrity and reliability of the banking system.

Terrorists can also try to attack us through our computers. We cannot afford to have harmful computer programs destroy the computers driving the greater San Francisco metropolitan air traffic controller network, the New York Stock Exchange, the life support systems of a major hospital, or the Northern Virginia metropolitan area fire and paramedic emergency dispatch service.

There are many different kinds of "bad" computer programs, which in general are termed "Trojan horses"—programs that cause a computer to act in a manner not intended by its operator, named after the famous wooden horse of Troy that delivered an attacking army disguised as an attractive gift. One of the most notorious kinds is so-called "computer viruses"—"diseases" that a computer can "catch" from another computer. A computer virus is a computer program that instructs the computer to do harmful or spurious things instead of useful things—and can also replicate itself to spread from one computer to another. Since the computer does whatever its instructions tell it to do, it will carry out the bad intent of a malicious human programmer who wrote the computer virus program—unless the computer is protected from the computer virus program. Special "anti-virus" protection software exists, but it unfortunately is only partially effective—for example, because new viruses can escape detection until they become widely known and recognized, and because sophisticated viruses can escape detection by masquerading as tasks the computer is supposed to be performing.

Computer security risks of all sorts—including the risks from computer viruses—have increased dramatically as computers have become increasingly connected to one another over the Internet and by other means. Increased computer connectivity provides increased capabilities, but also creates a host of computer security problems that haven't been fully solved. For example, electronic networks are an obvious path for spreading computer viruses. In October 1988, a university student used the Internet (a network of computer networks connected to millions of computers worldwide) to infect thousands of university and business computers with a self-replicating "worm" virus that took over the infected computers and caused them to execute the computer virus instead of performing the tasks they were supposed to perform. This computer virus outbreak (which resulted in a criminal prosecution) caused widespread panic throughout the electronic community.

Computer viruses are by no means the only computer security risk made even more significant by increased computer connectivity. For example, a significant percentage of the online electronic community has recently become committed to a new "portable" computer language called Java™ developed by Sun Microsystems of Mountain View, Calif. Java was designed to allow computers to interactively and dynamically download computer program code fragments (called "applets") over an electronic network such as the internet, and execute the downloaded code fragments locally. Java's "download and execute" capability is valuable because it allows certain tasks to be performed locally on local equipment using local resources. For example, a user's computer could run a particularly computationally or data-intensive routine—relieving the provider's computer from having to run the task and/or eliminating the need to transmit large amounts of data over the communications path.

While Java's "download and execute" capability has great potential, it raises significant computer security concerns. For example, Java applets could be written to damage hardware, software or information on the recipient computer, make the computer unstable by depleting its resources, and/or access confidential information on the computer and send it to someone else without first getting the computer owner's permission. People have expended lots of time and effort trying to solve Java's security problems. To alleviate some of these concerns, Sun Microsystems has developed a Java interpreter providing certain built-in security features such as:

a Java verifier that will not let an applet execute until the verifier verifies the applet doesn't violate certain rules, a Java class loader that treats applets originating remotely differently from those originating locally, a Java security manager that controls access to resources such as files and network access, and promised to come soon—the use of digital signatures for authenticating applets.

Numerous security flaws have been found despite these techniques. Moreover, a philosophy underlying this overall security design is that a user will have no incentive to compromise the security of her own locally installed Java interpreter—and that any such compromise is inconsequential from a system security standpoint because only the user's own computer (and its contents) are at risk. This philosophy—which is typical of many security system designs—is seriously flawed in many useful electronic commerce contexts for reasons described below in connection with the above-referenced Ginter et al. patent specification.

The Ginter et al. specification describes a "virtual distribution environment" comprehensively providing overall systems and wide arrays of methods, techniques, structures and arrangements that enable secure, efficient electronic commerce and rights management, including on the Internet or other "Information Super Highway."

The Ginter et al. patent disclosure describes, among other things, techniques for providing a secure, tamper resistant execution spaces within a "protected processing environment" for computer programs and data. The protected processing environment described in Ginter et al. may be hardware-based, software-based, or a hybrid. It can execute computer code the Ginter et al. disclosure refers to as "load modules." See, for example, Ginter et al. FIG. 23 and corresponding text. These load modules—which can be transmitted from remote locations within secure cryptographic wrappers or "containers"—are used to perform the basic operations of the "virtual distribution environment." Load modules may contain algorithms, data, cryptographic keys, shared secrets, and/or other information that permits a load module to interact with other system components (e.g., other load modules and/or computer programs operating in the same or different protected processing environment). For a load module to operate and interact as intended, it must execute without unauthorized modification and its contents may need to be protected from disclosure.

Unlike many other computer security scenarios, there may be a significant incentive for an owner of a Ginter et al. type protected processing environment to attack his or her own protected processing environment. For example:

the owner may wish to "turn off" payment mechanisms necessary to ensure that people delivering content and other value receive adequate compensation; or the owner may wish to defeat other electronic controls preventing him or her from performing certain tasks (for example, copying content without authorization); or the owner may wish to access someone else's confidential information embodied within electronic controls present in the owner's protected processing environment; or the owner may wish to change the identity of a payment recipient indicated within controls such that they receive payments themselves, or to interfere with commerce; or the owner may wish to defeat the mechanism(s) that disable some or all functions when budget has been exhausted, or audit trails have not been delivered.

Security experts can often be heard to say that to competently do their job, they must "think like an attacker." For example, a successful home security system installer must try to put herself in the place of a burglar trying to break in. Only by anticipating how a burglar might try to break into a house can the installer successfully defend the house against burglary. Similarly, computer security experts must try to anticipate the sorts of attacks that might be brought against a presumably secure computer system.

From this "think like an attacker" viewpoint, introducing a bogus load module is one of the strongest possible forms of attack (by a protected processing environment user or anyone else) on the virtual distribution environment disclosed in the Ginter et al. patent specification. Because load modules have access to internal protected data structures within protected processing environments and also (at least to an extent) control the results brought about by those protected processing environments, bogus load modules can (putting aside for the moment additional possible local protections such as addressing and/or ring protection and also putting aside system level fraud and other security related checks) perform almost any action possible in the virtual distribution environment without being subject to intended electronic controls. Especially likely attacks may range from straightforward changes to protected data (for example, adding budget, billing for nothing instead of the desired amount, etc.) to wholesale compromise (for example, using a load module to expose a protected processing environment's cryptographic keys). For at least these reasons, the methods for validating the origin and soundness of a load module are critically important.

The Ginter et al. patent specification discloses important techniques for securing protected processing environments against inauthentic load modules introduced by the computer owner, user, or any other party, including for example:

Encrypting and authenticating load modules whenever they are shared between protected processing environments via a communications path outside of a tamper-resistant barrier and/or passed between different virtual distribution environment participants;

Using digital signatures to determine if load module executable content is intact and was created by a trusted source (i.e., one with a correct certificate for creating load modules);

Strictly controlling initiation of load module execution by use of encryption keys, digital signatures and/or tags;

Carefully controlling the process of creating, replacing, updating or deleting load modules; and Maintaining shared secrets (e.g., cryptographic keys) within a tamper resistant enclosure that the owner of the electronic appliance cannot easily tamper with.

Although the Ginter et al. patent specification comprehensively solves a host of load module (and other) security related problems, any computer system—no matter how secure—can be "cracked" if enough time, money and effort is devoted to the project. Therefore, even a very secure system such as that disclosed in Ginter et al. can be improved to provide even greater security and protection against attack.

The present invention provides improved techniques for protecting secure computation and/or execution spaces (as one important but non-limiting example, the protected processing environments as disclosed in Ginter et al) from unauthorized (and potentially harmful) load modules or other "executables" or associated data. In one particular preferred embodiment, these techniques build upon, enhance and/or extend in certain respects, the load module security techniques, arrangements and systems provided in the Ginter et al. specification.

In accordance with one aspect provided by the present invention, one or more trusted verifying authorities validate load modules or other executables by analyzing and/or testing them. A verifying authority digitally "signs" and "certifies" those load modules or other executables it has verified (using a public key based digital signature and/or certificate based thereon, for example).

Protected execution spaces such as protected processing environments can be programmed or otherwise conditioned to accept only those load modules or other executables bearing a digital signature/certificate of an accredited (or particular) verifying authority. Tamper resistant barriers may be used to protect this programming or other conditioning. The assurance levels described below are a measure or assessment of the effectiveness with which this programming or other conditioning is protected.

A web of trust may stand behind a verifying authority. For example, a verifying authority may be an independent organization that can be trusted by all electronic value chain participants not to collaborate with any particular participant to the disadvantage of other participants. A given load module or other executable may be independently certified by any number of authorized verifying authority participants. If a load module or other executable is signed, for example, by five different verifying authority participants, a user will have (potentially) a higher likelihood of finding one that they trust. General commercial users may insist on several different certifiers, and government users, large corporations, and international trading partners may each have their own unique "web of trust" requirements. This "web of trust" prevents value chain participants from conspiring to defraud other value chain participants.

In accordance with another aspect provided by this invention, each load module or other executable has specifications associated with it describing the executable, its operations, content, and functions. Such specifications could be represented by any combination of specifications, formal mathematical descriptions that can be verified in an automated or other well-defined manner, or any other forms of description that can be processed, verified, and/or tested in an automated or other well-defined manner. The load module or other executable is preferably constructed using a programming language (e.g., languages such as Java and Python) and/or design/implementation methodology (e.g., Gypsy, FDM) that can facilitate automated analysis, validation, verification, inspection, and/or testing.

A verifying authority analyzes, validates, verifies, inspects, and/or tests the load module or other executable, and compares its results with the specifications associated with the load module or other executable. A verifying authority may digitally sign or certify only those load modules or other executables having proper specifications— and may include the specifications as part of the material being signed or certified.

A verifying authority may instead, or in addition, selectively be given the responsibility for analyzing the load module and generating a specification for it. Such a specification could be reviewed by the load module's originator and/or any potential users of the load module.

A verifying authority may selectively be given the authority to generate an additional specification for the load module, for example by translating a formal mathematical specification to other kinds of specifications. This authority could be granted, for example, by a load module originator wishing to have a more accessible, but verified (certified), description of the load module for purposes of informing other potential users of the load module.

Additionally, a verifying authority may selectively be empowered to modify the specifications to make it accurate—but may refuse to sign or certify load modules or other executables that are harmful or dangerous irrespective of the accuracy of their associated specifications. The specifications may in some instances be viewable by ultimate users or other value chain participants—providing a high degree of assurance that load modules or other executables are not subverting the system and/or the legitimate interest of any participant in an electronic value chain the system supports.

In accordance with another aspect provided by the present invention, an execution environment protects itself by deciding—based on digital signatures, for example—which load modules or other executables it is willing to execute. A digital signature allows the execution environment to test both the authenticity and the integrity of the load module or other executables, as well permitting a user of such executables to determine their correctness with respect to their associated specifications or other description of their behavior, if such descriptions are included in the verification process.

A hierarchy of assurance levels may be provided for different protected processing environment security levels. Load modules or other executables can be provided with digital signatures associated with particular assurance levels. Appliances assigned to particular assurance levels can protect themselves from executing load modules or other executables associated with different assurance levels. Different digital signatures and/or certificates may be used to distinguish between load modules or other executables intended for different assurance levels. This strict assurance level hierarchy provides a framework to help ensure that a more trusted environment can protect itself from load modules or other executables exposed to environments with different work factors (e.g., less trusted or tamper resistant environments). This can be used to provide a high degree of security compartmentalization that helps protect the remainder of the system should parts of the system become compromised.

For example, protected processing environments or other secure execution spaces that are more impervious to tampering (such as those providing a higher degree of physical security) may use an assurance level that isolates it from protected processing environments or other secure execution spaces that are relatively more susceptible to tampering (such as those constructed solely by software executing on a general purpose digital computer in a non-secure location).

A verifying authority may digitally sign load modules or other executables with a digital signature that indicates or implies assurance level. A verifying authority can use digital signature techniques to distinguish between assurance levels. As one example, each different digital signature may be encrypted using a different verification key and/or fundamentally different encryption, one-way hash and/or other techniques. A protected processing environment or other secure execution space protects itself by executing only those load modules or other executables that have been digitally signed for its corresponding assurance level.

The present invention may use a verifying authority and the digital signatures it provides to compartmentalize the different electronic appliances depending on their level of security (e.g., work factor or relative tamper resistance). In particular, a verifying authority and the digital signatures it provides isolate appliances with significantly different work factors—preventing the security of high work factor appliances from collapsing into the security of low work factor appliances due to free exchange of load modules or other executables.

Encryption can be used in combination with the assurance level scheme discussed above to ensure that load modules or other executables can be executed only in specific environments or types of environments. The secure way to ensure that a load module or other executable can't execute in a particular environment is to ensure that the environment doesn't have the key(s) necessary to decrypt it. Encryption can rely on multiple public keys and/or algorithms to transport basic key(s). Such encryption protects the load module or other executable from disclosure to environments (or assurance levels of environments) other than the one it is intended to execute in.

In accordance with another aspect provided by this invention, a verifying authority can digitally sign a load module or other executable with several different digital signatures and/or signature schemes. A protected processing environment or other secure execution space may require a load module or other executable to present multiple digital signatures before accepting it. An attacker would have to "break" each (all) of the several digital signatures and/or signature schemes to create an unauthorized load module or other executable that would be accepted by the protected processing environment or other secure execution space. Different protected processing environments (secure execution spaces) might examine different subsets of the multiple digital signatures—so that compromising one protected processing environment (secure execution space) will not compromise all of them. As an optimization, a protected processing environment or other secure execution space might verify only one of the several digital signatures (for example, chosen at random each time an executable is used)—thereby speeding up the digital signature verification while still maintaining a high degree of security.

BRIEF DESCRIPTION OF THE DRAWINGS

These and other features and advantages provided in accordance with this invention may be better and more completely understood by referring to the following detailed description of example preferred embodiments in conjunction with the drawings, of which:

FIG. 4 shows an example process a verifying authority may perform to authenticate load modules;

FIG. 6 shows how a protected processing environment can securely authenticate a verifying authority's digital signature to guarantee the integrity of the corresponding load module;

FIG. 7 shows how several different digital signatures can be applied to the same load module;

FIG. 8 shows how a load module can be distributed with multiple digital signatures;

FIG. 8A shows how key management can be used to compartmentalize protected processing environments;

FIGS. 9 shows how a load module can be segmented and each segment protected with a different digital signature;

FIGS. 10A–10C show how different assurance level electronic appliances can be provided with different cryptographic keys for authenticating verifying authority digital signatures;

FIGS. 11A–11C show how a verifying authority can use different digital signatures to designate the same or different load modules as being appropriate for execution by different assurance level electronic appliances;

FIGS. 12, 13 and 13A show how assurance level digital signatures can be used to isolate electronic appliances or appliance types based on work factor and/or tamper resistance to reduce overall security risks.

DETAILED DESCRIPTION OF EXAMPLE EMBODIMENTS

Figure 1:
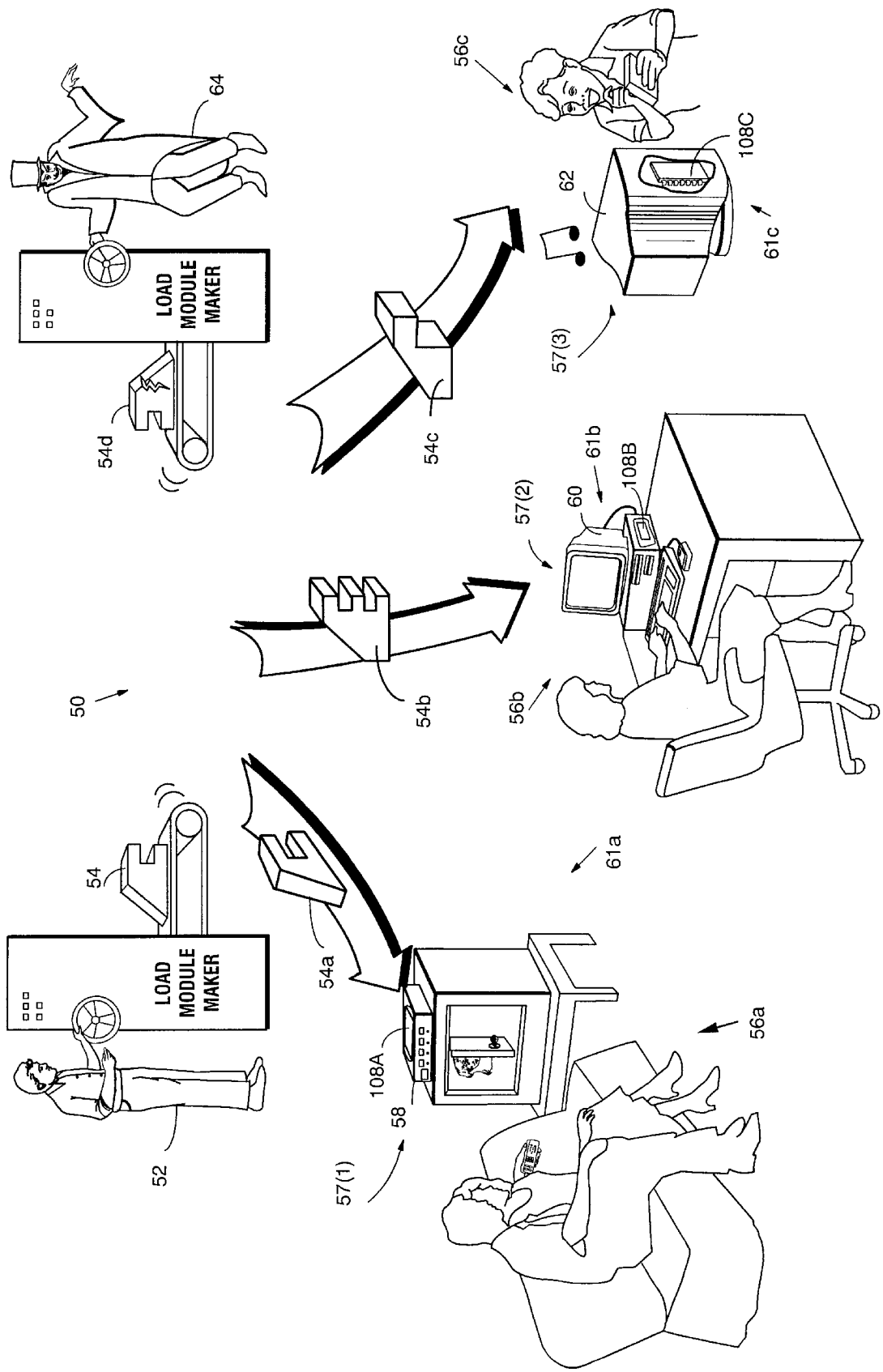
FIG. 1 illustrates how defective or bogus load modules can wreak havoc in the electronic community.

FIG. 1 shows how defective, bogus and/or unauthorized computer information can wreak havoc within an electronic system 50. In this example, provider 52 is authorized to produce and distribute "load modules" 54 for use by different users or consumers 56. FIG. 1 shows "load module" 54 as a complicated looking machine part for purposes of illustration only; the load module preferably comprises one or more computer instructions and/or data elements used to assist, allow, prohibit, direct, control or facilitate at least one task performed at least in part by an electronic appliance such as a computer. For example, load module 54 may comprise all or part of an executable computer program and/or associated data ("executable"), and may constitute a sequence of instructions or steps that bring about a certain result within a computer or other computation element.

FIG. 1 shows a number of electronic appliances 61 such as, for example, a set top box or home media player 58, a personal computer 60, and a multi-media player 62. Each of appliances 58, 60, 62 may include a secure execution space. One particular example of a secure execution space is a "protected processing environment" 108 of the type shown in Ginter et al. (see FIGS. 6–12) and described in associated text. Protected processing environments 108 provide a secure execution environment in which appliances 58, 60, 62 may securely execute load modules 54 to perform useful tasks. For example:

Provider 52 might produce a load module 54a for use by the protected processing environment 108A within set top box or home media player 58. Load module 54a could, for example, enable the set top box/home media player 58 to play a movie, concert or other interesting program, charge users 56a a "pay per view" fee, and ensure that the fee is paid to the appropriate rights holder (for example, the film studio, concert promoter or other organization that produced the program material).

Provider 52 might produce another load module 54b for delivery to personal computer 60's protected processing environment 108B. The load module 54b might enable personal computer 60 to perform a financial transaction, such as, for example, home banking, a stock trade or an income tax payment or reporting.

Provider 52 could produce a load module 54c for delivery to multi-media player 62's protected processing environment 108c. This load module 54c might allow user 56c to view a particular multi-media presentation while preventing the user from making a copy of the presentation—or it could control a portion of a transaction (e.g. a meter that records usage, and is incorporated into a larger transaction involving other load modules associated with interacting with a multi-media piece). (As described in the Ginter et al. specification, load modules associated with the financial portion of a transaction, for example, may often be self contained and independent).

FIG. 1 also shows an unauthorized and/or disreputable load module provider 64. Unauthorized provider 64 knows how to make load modules that look a lot like the load modules produced by authorized load module provider 52—but are defective or even destructive. Unless precautions are taken, the unauthorized load module 54d made by unauthorized producer 64 will be able to run on protected processing environments 108 within appliances 58, 60 and 62, and may cause serious harm to users 56 and/or to the integrity of system 50. For example:

unauthorized provider 64 could produce a load module 54d that is quite similar to authorized load module 54a intended to be us ed by set top box or home media player 58. The unauthorized load module 54d might allow protected processing environment 108A within set top box/home media player 58 to present the very same program material—but divert some or all of the user's payment to unauthorized producer 64—thereby defrauding the rights holders in the program material the users watch.

Unauthorized provider 64 might produce an unauthorized version of load module 54b that could, if run by personal computer 60's protected processing environment 108b, disclose the user 64b's bank and credit card account numbers to unauthorized provider 64 and/or divert electronic or other funds to the unauthorized provider.

Unauthorized provider 64 could produce an unauthorized version of load module 54c that could damage the protected processing environment 108c within multi media player 62—erasing data it needs for its operation and making it unusable. Alternatively, an unauthorized version of load module 54c could defeat the copy protection provided by multi media player 62's protected processing environment, causing the makers of multi media programs to lose substantial revenues through unauthorized copying—or defeat or alter the part of the transaction provided by the load module (e.g., billing, metering, maintaining an audit trail, etc.)

Figure 2:
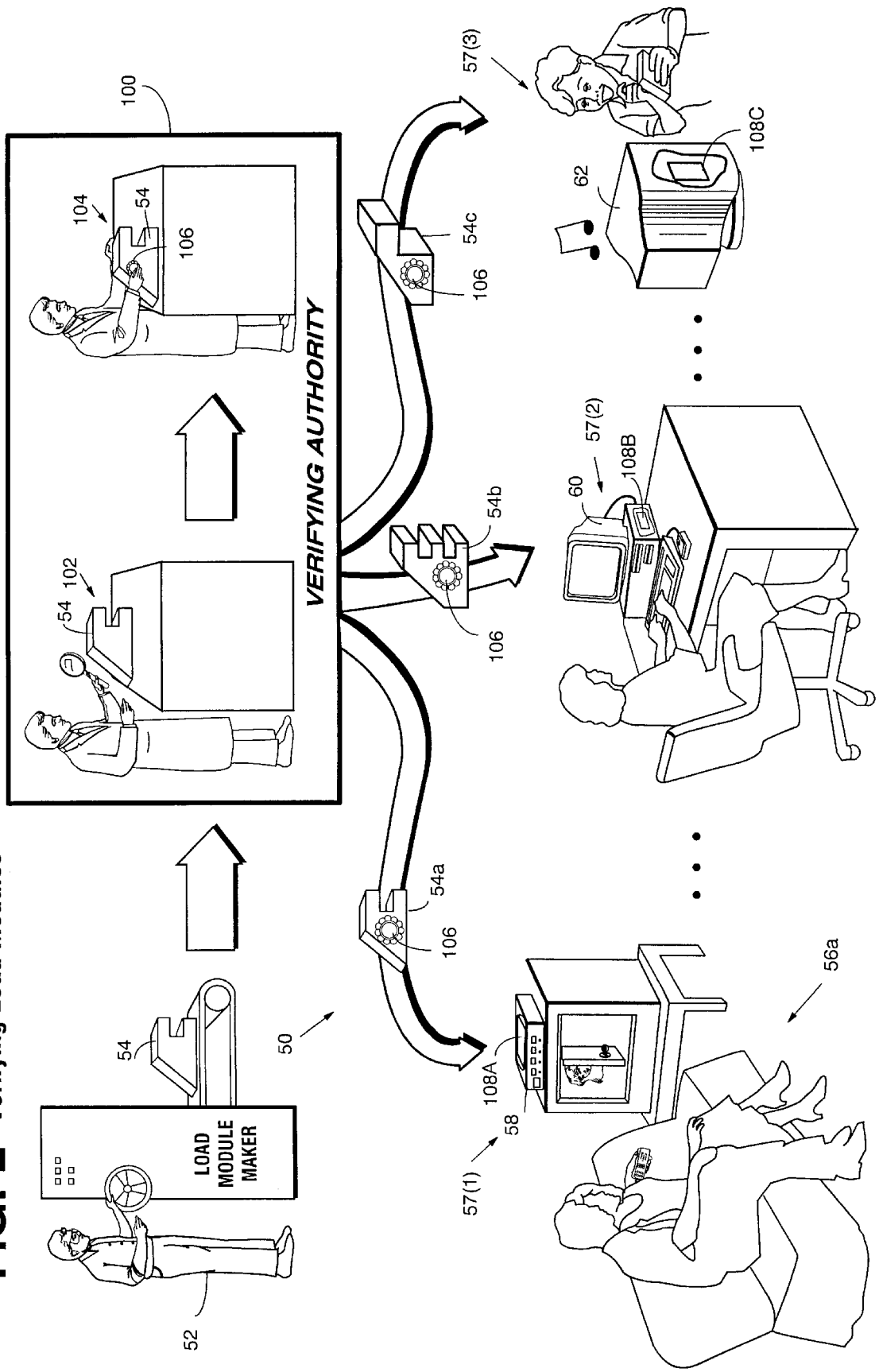
FIG. 2 shows an example verification authority that protects the electronic community from unauthorized load modules.

FIG. 2 shows how a verifying authority 100 can prevent the problems shown in FIG. 1. In this example, authorized provider 52 submits load modules 54 to verifying authority 100. Verifying authority 100 carefully analyzes the load modules 54 (see 102), testing them to make sure they do what they are supposed to do and do not compromise or harm system 50. If a load module 54 passes the tests verifying authority 100 subjects it to, a verifying authority may affix a digital "seal of approval" (see 104) to the load module.

Figure 3:
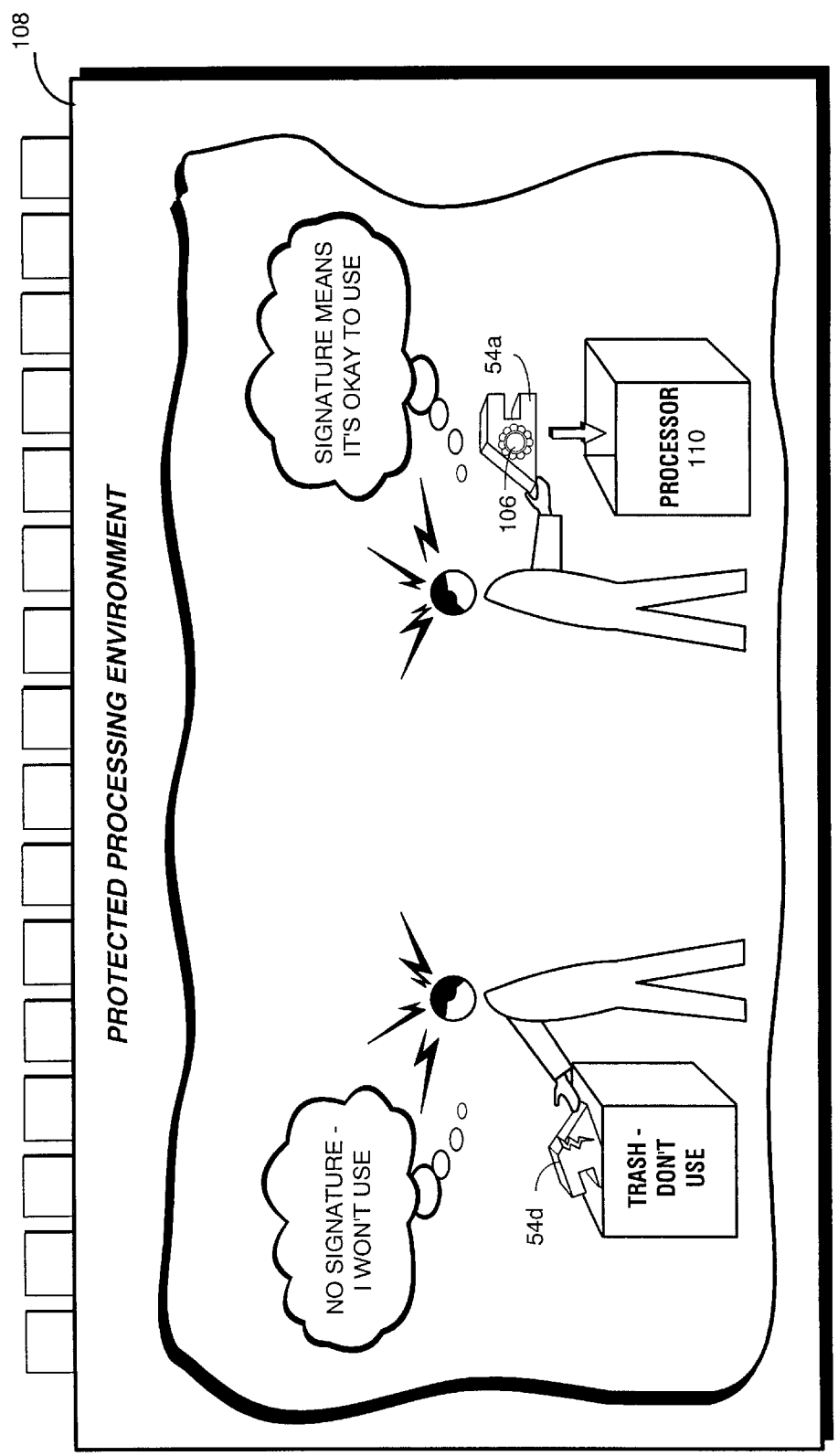
FIG. 3 shows how a protected processing environment can distinguish between load modules that have been approved by a verifying authority and those that have not been approved.

Protected processing environments 108 can use this digital "seal of approval" 106 (which may comprise one or more "digital signatures") to distinguish between authorized and unauthorized load modules 54. FIG. 3 illustrates how an electronic protected processing environment 108 can use and rely on a verifying authority's digital seal of approval 106. In this example, the protected processing environment 108 can distinguish between authorized and unauthorized load modules 54 by examining the load module to see whether it bears the seal of verifying authority 100. Protected processing environment 108 will execute the load module 54a with its processor 110 only if the load module bears a verifying authority's seal 106. Protected processing environment 108 discards and does not use any load module 54 that does not bear this seal 106. In this way, protected processing environment 108 securely protects itself against unauthorized load modules 54 such as, for example, the defective load module 54d made by disreputable load module provider 64.

FIG. 4 shows the analysis and digital signing steps 102, 104 performed by verifying authority 100 in this example. Provider 54 may provide, with each load module 54, associated specifications 110 identifying the load module and describing the functions the load module performs. In this example, these specifications 110 are illustrated as a manufacturing tag, but preferably comprises a data file associated with and/or attached to the load module 54.

Verifying authority 100 uses an analyzing tool(s) 112 to analyze and test load module 54 and determine whether it performs as specified by its associated specifications 110—that is, whether the specifications are both accurate and complete. FIG. 4 illustrates an analysis tool 112 as a magnifying glass; verifying authority 100 may not rely on visual inspection only, but instead preferably uses one or more computer-based software testing techniques and/or tools to verify that the load module performs as expected, matches specifications 110, is not a "virus," and includes no significant detectable "bugs" or other harmful functionality. See for example Pressman, *Software Engineering: A Practitioner's Approach* (3d Ed., McGraw-Hill 1992) at chapters 18 and 19 ("Software Testing Techniques") (pages 595–661) and the various books and papers referenced there. Although it has been said that "testing can show only the presence of bugs, not their absence," such testing (in addition to ensuring that the load module 54 satisfies its specifications 110) can provide added degrees of assurance that the load module isn't harmful and will work as it is supposed to.

Verifying authority 100 is preferably a trusted, independent third party such as an impartial, well respected independent testing laboratory. Therefore, all participants in an electronic transaction involving load module 54 can trust a verifying authority 100 as performing its testing and analysis functions competently and completely objectively and impartially. As described above, there may be several different verifying authorities 100 that together provide a "web of trust". Several different verifying authorities may each verify and digitally sign the same load module—increasing the likelihood that a particular value chain participant will trust one of them and decreasing the likelihood of collusion or fraud. Electronic value chain participants may rely upon different verifying authorities 100 to certify different types of load modules. For example, one verifying authority 100 trusted by and known to financial participants might verify load modules relating to financial aspects of a transaction (e.g., billing), whereas another verifying authority 100' trusted by and known to participants involved in using the "information exhaust" provided by an electronic transaction might be used to verify load modules relating to usage metering aspects of the same transaction.

Once verifying authority 100 is satisfied with load module 54, it affixes its digital "seal of approval" 106 to the load module. FIG. 4 illustrates the digital sealing process as being performed by a stamp 114—but in the preferred embodiment the digital sealing process is actually performed by creating a "digital signature" using a well known process.

There exist many well known processes for creating digital signatures. One example is the Digital Signature Algorithm (DSA). DSA uses a public-key signature scheme that performs a pair of transformations to generate and verify a digital value called a "signature." DSA uses the parameters, p, q, g, x, and y, such that:

p=a prime number L bits long, wherein L ranges from 512 to 1024 and is a multiple of 64;

q=a 160-bit prime factor of p−1;

g=$h^{(P-1)/q}$ mod p, where h is any number less than p−1 such that $h^{(P-1)/q}$ mod p is greater than 1;

x=a number less than q; and y=$g^x$ mod p.

The algorithm also makes use of a one-way hash function, H(m), such as, for example, the Secure Hash Algorithm. The first three parameters, p, q, and g, are public and may be shared across a network of users. The private key is x; the public key is y. To sign a message, m, using DSA, a signer generates a random number, k, less than q. The signer also generates:

$$r=(g^k \bmod p) \bmod q;$$

and $$s=(k^{-1}(H(m)+xr)) \bmod q$$

The parameters r and s comprise the signer's signature, which may be sent to a recipient or distributed across a network. A recipient verifies the signature by computing:

$$w=s^{-1} \bmod q;$$

$$u_1=(H(m)*w) \bmod q;$$

$$u_2=(rw) \bmod q;$$

and $$v=((g^{u_1}*y^{u_2}) \bmod p) \bmod q.$$

If v=r, the signature is verified.

There exist multiple variations of DSA. In one such variant, for example, the signer does not compute k−1. Instead, using the same parameters as in DSA, the signer generates two random numbers, k and d, both less than q. The signature comprises:

$$r=(g^k \bmod p) \bmod q;$$

$$s=(H(m)+xr)-d \bmod q;$$

and $$t=kd \bmod q.$$

A recipient verifies the signature by computing:

$$w=t/s \bmod q;$$

$$u_1=(H(m)*w) \bmod q;$$

and $$u_2=(rw) \bmod q.$$

If r=$((g^{u_1}-y^{u_2}) \bmod p) \bmod q$, then the signature is verified.

In other variants, the signer may generate a random number, k, less than q. The signature then comprises:

$$r=(g^k \bmod p) \bmod q;$$

and $$s=k*(H(m)+xr)^{-1} \bmod q$$

A recipient verifies the signature by computing $u_1$ and $u_2$, such that:

$$u_1=(H(m)*s) \bmod q$$

$$u_2=(sr) \bmod q$$

If r=$((g^{u_1}-y^{u_2}) \bmod p) \bmod q$, then the signature is verified.

Yet another variant of DSA uses a prime number generation scheme that embeds q and the parameters used to generate the primes within p. Using this method, the values of C and S used to generate p and q are embedded within p and do not need to be stored, thereby minimizing the amount of memory used. This variant may be described as follows:

(1) Choose, S, arbitrary sequence of at least 160 bits; g is the length of S in bits;

(2) Compute U=SHA(S)+SHA((S+1) mod $2^g$), where SHA is the Secure Hash Algorithm;

(3) Let q=U with the most significant bit and the least significant bit of U set to 1;

(4) Check whether q is prime;

(5) Let p be the concatenation of q, S, C, and SHA(S), C is set to 32 zero bits;

(6) p=p−(p mod q)+1;

(7) p=p+q;

(8) If the C in p is 0×7fffff, go to step (1);

(9) Check whether p is prime; and

(10) If p is composite, go to step (7).

Still another variant of DSA is the Russian digital signature standard, officially known as GOST R 34-10-94. The algorithm is very similar to DSA, and uses the following parameters:

p=a prime number, either between 509 and 512 bits long, or between 1020 and 1024 bits long;

q=a 254- to 256-bit prime factor of p−1;

a=any number less than p−1 such that $a^q$ mod p=1;

x=a number less than q; and y=$a^x$ mod p.

This algorithm also uses a one-way hash function, H(x), such as, for example, GOST R 34.11-94, a function based on the GOST symmetric algorithm. The first three parameters, p, q, and a, are public and may be distributed across a network of users. The private key is x, the public key is y.

To sign a message, m, using GOST DSA, a signer generates a random number, k, less than q, and generates r=($a^k$ mod p) mod q and s=(xr+k(H(m))) mod q. If H(m) mod q=0, then set it equal to 1. If r=0, then choose another k and start again. The signature is comprised of two numbers: r mod $2^{256}$ and s mod $2^{256}$. A sender transmits these two numbers to a recipient, who verifies the signature by computing:

$$v=H(m)^{q-2} \bmod q;$$

$$Z^1=(sv) \bmod q;$$

$$Z^2=((q-r)*v) \bmod q;$$

and $$u=((a^{Z^1}*y^{Z^2}) \bmod p) \bmod q.$$

If u=r, then the signature is verified.

Many signature schemes are very similar. In fact, there are thousands of general digital signature schemes based on the Discrete Logarithm Problem, like DSA. Additional information on the digital signature standard can be found in National Institute of Standards and Technology (NIST) FIPS Pub. 186, "Digital Signature Standard," U.S. Dept. of Commerce, May 1994. See Schneier, *Applied Cryptography*

(2d Ed. John Wiley & Sons 1996) at Chapter 20 (pages 483–502). This digital signature, certificate or seal creation process is illustrated in FIG. 5.

Figure 5:
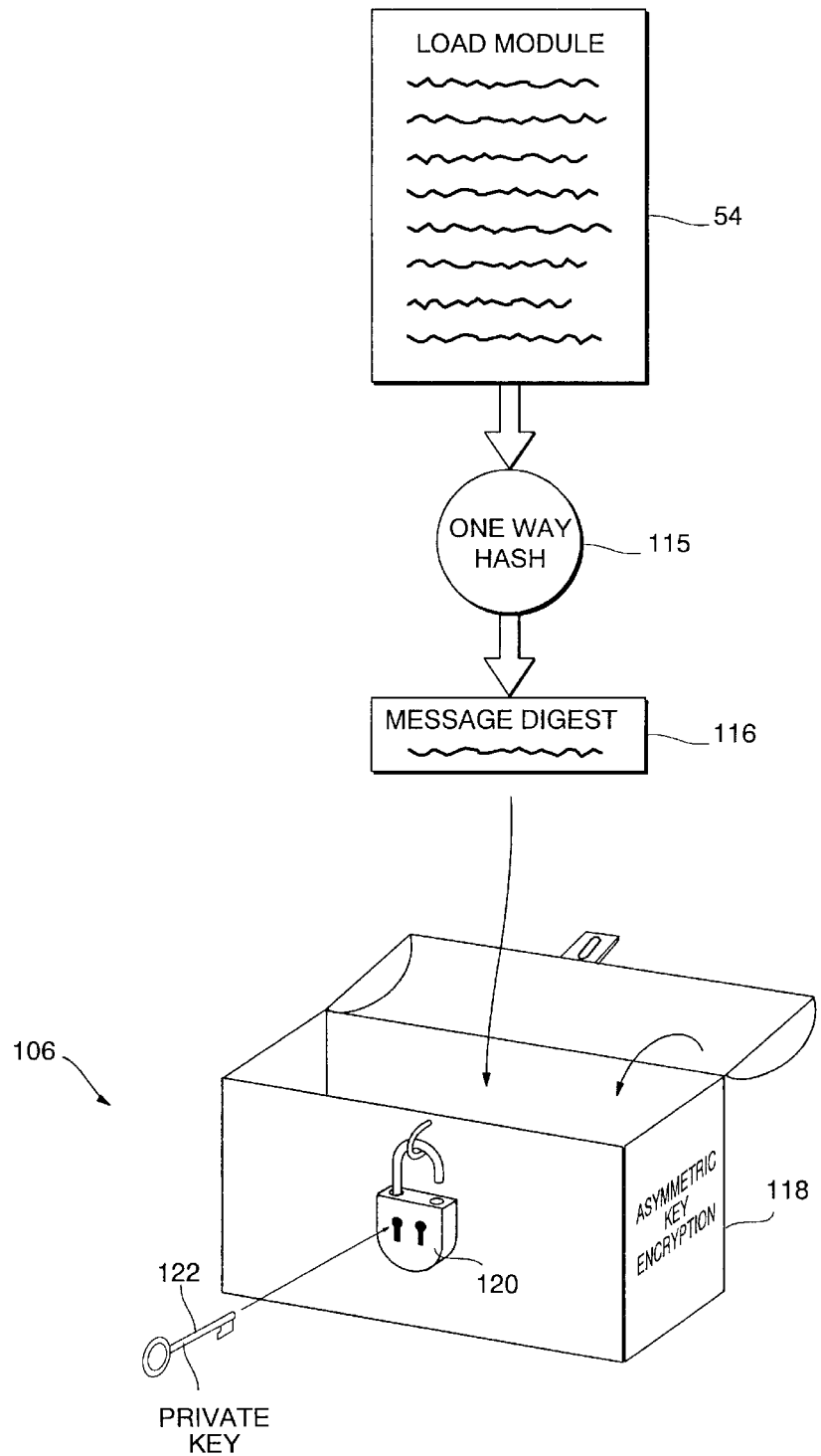
FIG. 5 shows how a verifying authority can create a certifying digital signature.

In the FIG. 5 process, load module 54 (along with specifications 110 if desired) is processed to yield a "message digest" 116 using a conventional one-way hash function selected to provide an appropriate resistance to algorithmic attack. See, for example, the transformation processes discussed in the Schneier text at Chapter 18, pages 429–455. A one-way hash function 115 provides a "fingerprint" (message digest 116) that is unique to load module 54. The one-way hash function transforms the contents of load module 54 into message digest 116 based on a mathematical function. This one-way hash mathematical function has the characteristic that it is easy to calculate message digest 116 from load module 54, but it is hard (computationally infeasible) to calculate load module 54 starting from message digest 116 and it is also hard (computationally infeasible) to find another load module 54' that will transform to the same message digest 116. There are many potential candidate functions (e.g., MD5, SHA), families of functions (e.g., MD5, or SHA with different internal constants), and keyed functions (e.g., message authentication codes based on block ciphers such as DES) that may be employed as one-way hash functions in this scheme. Different functions may have different cryptographic strengths and weaknesses so that techniques which may be developed to defeat one of them are not necessarily applicable to others.

Message digest 116 may then be encrypted using asymmetric key cryptography. FIG. 5 illustrates this encryption operation using the metaphor of a strong box 118. The message digest 116 is placed into strong box 118, and the strongbox is locked with a lock 120 having two key slots opened by different ("asymmetrical") keys. A first key 122 (sometimes called the "private" key) is used to lock the lock. A second (different) key 124 (sometimes called the "public" key) must be used to open the lock once the lock has been locked with the first key. The encryption algorithm and key length is selected so that it is computationally infeasible to calculate first key 122 given access to second key 124, the public key encryption algorithm, the clear text message digest 116, and the encrypted digital signature 106. There are many potential candidate algorithms for this type of asymmetric key cryptography (e.g., RSA, DSA, El Gamal, Elliptic Curve Encryption). Different algorithms may have different cryptographic strengths and weaknesses so that techniques which may be developed to defeat one of them are not necessarily applicable to others.

In this case the first key is owned by verifying authority 100 and is kept highly secure (for example, using standard physical and procedural measures typically employed to keep an important private key secret while preventing it from being lost). Once message digest 116 is locked into strong box 118 using the first key 122 the strong box can be opened only by using the corresponding second key 124. Note that other items (e.g., further identification information, a time/date stamp, etc.) can also be placed within strong box 106.

FIG. 6 shows how a protected processing environment 108 "authenticates" the digital signature 106 created by the FIG. 5 process. Second key 124 and the one-way hash algorithm are first securely provided to the protected processing environment. For example, a secure key exchange protocol can be used as described in connection with FIG. 64 of the Ginter et al. patent specification. Public key cryptography allow s second key 124 to be made public without compromising first key 122. However, in this example, protected processing environment 108 preferably keeps the second key 124 (and, if desired, also the one-way hash algorithm and/or its associated key) secret to further increase security.

Maintaining "public" verification key 124 as a secret within tamper resistant protected processing environment 108 greatly complicates the job of generating bogus digital signatures 106. If the attacker does not possess second key 124, the difficulty of an algorithmic attack or cryptanalytic attack on the verification digital signature algorithm is significantly increased, and the attacker might be reduced to exhaustive search (brute force) type attacks which would be even less practical because the search trials would require attempting to present a bogus load module 54 to protected processing environment 108—which, after a few such attempts is likely to refuse all further attempts. Keeping second key 124 secret also requires a multi-disciplinary attack: an attacker must both (A) extract the secret from protected processing environment 108, and (B) attack the algorithm. It may be substantially less likely that a single attacker may have expertise in each of these two specialized disciplines.

In addition, maintaining the "public" key within a tamper-resistant environment forecloses the significant threat that the owner of protected processing environment 108 may himself attack the environment. For example, if the owner could replace the appropriate "public" key 124 with his own substitute public key, the owner could force the protected processing environment 108 to execute load modules 54 of his own design—thereby compromising the interests of others in enforcing their own controls within the owner's protected processing environment. For example, the owner could turn off the control that required him to pay for watching or prohibited him from copying content. Since protected processing environment 108 can support a "virtual business presence" by parties other than the owner, it is important for the protected processing environment to be protected against attacks from the owner.

The load module 54 and its associated digital signature 106 is then delivered to the protected processing environment 108. (These items can be provided together at the same time, independently, or at different times.) Protected processing environment 115 applies the same one way hash transformation on load module 54 that a verifying authority 100 applied. Since protected processing environment 108 starts with the same load module 54 and uses the same one-way hash function 115, it should generate the same message digest 116'.

Protected processing environment 108 then decrypts digital signature 106 using the second key 124—i.e., it opens strongbox 118 to retrieve the message digest 116 a verifying authority 100 placed in there. Protected processing environment 108 compares the version of message digest 116 it obtains from the digital signature 106 with the version of message digest 116' it calculates itself from load module 54 using the one way hash transformation 115. The message digests 116, 116' should be identical. If they do not match, digital signature 106 is not authentic or load module 54 has been changed—and protected processing environment 108 rejects load module 54.

FIG. 7 shows that multiple digital signatures 106(1), 106(2), ... 106(N) can be created for the same load module 54. For example:

one digital signature 106(1) can be created by encrypting message digest 116 with a "private" key 122(1), another (different) digital signature 106(2) can be created by encrypting the message digest 116 with a different "private" key 122(2), possibly employing a different signature algorithm, and a still different digital signature 106(N) can be generated by encrypting the message digest using a still different "private" key 122(N), possibly employing a different signature algorithm.

The public key 124(1) corresponding to private key 122(1) acts only to decrypt (authenticate) digital signature 106(1). Similarly, digital signature 106' can only be decrypted (authenticated) using public key 124(2) corresponding to the private 122(2). Public key 124(1) will not "unlock" digital signature 106(2) and public key 124(2) will not "unlock" digital signature 106(1).

Different digital signatures 106(1), 106(N) can also be made by using different one way hash functions 115 and/or different encryption algorithms. As shown in FIG. 8, a load module 54 may have multiple different types of digital signatures 106 associated with it. Requiring a load module 54 to present, to a protected processing environment 108, multiple digital signatures 106 generated using fundamentally different techniques decreases the risk that an attacker can successfully manufacture a bogus load module 54.

For example, as shown in FIG. 8, the same load module 54 might be digitally signed using three different private keys 122, cryptographic algorithms, and/or hash algorithms. If a given load module 54 has multiple distinct digital signatures 106 each computed using a fundamentally different technique, the risk of compromise is substantially lowered. A single algorithmic advance is unlikely to result in simultaneous success against both (or multiple) cryptographic algorithms. The two digital signature algorithms in widespread use today (RSA and DSA) are based on distinct mathematical problems (factoring in the case of RSA, discrete logs for DSA). The most currently popular one-way hash functions (MD4/MD5 and SHA) have similar internal structures, possibly increasing the likelihood that a successful attack against one would lead to a success against another. However, hash functions can be derived from any number of different block ciphers (e.g., SEAL, IDEA, triple-DES) with different internal structures; one of these might be a good candidate to complement MD5 mor SHA.

Multiple signatures as shown in FIG. 8 impose a cost of additional storage for the signatures 106 in each protected load module 54, additional code in the protected processing environment 108 to implement additional algorithms, and additional time to verify the digital signatures (as well as to generate them at verification time). As an optimization to the use of multiple keys or algorithms, an appliance 61 might verify only a subset of several signatures associated with a load module 54 (chosen at random) each time the load module is used. This would speed up signature verification while maintaining a high probability of detection. For example, suppose there are one hundred "private" verification keys, and each load module 54 carries one hundred digital signatures. Suppose each protected processing environment 108, on the other hand, knows only a few (e.g., ten) of these corresponding "public" verification keys randomly selected from the set. A successful attack on that particular protected processing environment 108 would permit it to be compromised and would also compromise any other protected processing environment possessing and using precisely that same set often keys. However, it would not compromise most other protected processing environments—since they would employ a different subset of the keys used by verifying authority 100.

FIG. 8A shows a simplified example of different processing environments 108(1), . . . , 108(N) possessing different subsets of "public" keys used for digital signature authentication—thereby compartmentalizing the protected processing environments based on key management and availability. The FIG. 8A illustration shows each protected processing environment 108 having only one "public" key 124 that corresponds to one of the digital signatures 106 used to "sign" load module 54. As explained above, any number of digital signatures 106 may be used to sign the load module 54—and different protected processing environment 108 may possess any subset of corresponding "public" keys.

FIG. 9 shows that a load module 54 may comprise multiple segments 55(1), 55(2), 55(3) signed using different digital signatures 106. For example:

a first load module segment 55(1) might be signed using a digital signature 106(1);

a second load module segment 55(2) might be digitally signed using a second digital signature 106(2); and a third load module segment 55(3) might be signed using a third digital signature 106(3).

These three signatures 55(1), 55(2), 55(3) could all be affixed by the same verifying authority 100, or they could be affixed by three different verifying authorities (providing a "web of trust"). (In another model, a load module is verified in its entirety by multiple parties—if a user trusts any of them, she can trust the load module.) A protected processing environment 108 would need to have all three corresponding "public" keys 124(1), 124(2), 124(3) to authenticate the entire load module 54—or the different load module segments could be used by different protected processing environments possessing the corresponding different keys 124(1), 124(2), 124(3). Different signatures 55(1), 55(2), 55(3) could be calculated using different signature and/or one-way hash algorithms to increase the difficulty of defeating them by cryptanalytic attack.

Assurance Levels

Verifying authority 100 can use different digital signing techniques to provide different "assurance levels" for different kinds of electronic appliances 61 having different "work factors" or levels of tamper resistance. FIGS. 10A–10C show an example assurance level hierarchy providing three different assurance levels for different electronic appliance types:

Assurance level I might be used for an electronic appliance(s) 61 whose protected processing environment 108 is based on software techniques that may be somewhat resistant to tampering. An example of an assurance level I electronic appliance 61A might be a general purpose personal computer that executes software to create protected processing environment 108.

An assurance level II electronic appliance 61B may provide a protected processing environment 108 based on a hybrid of software security techniques and hardware-based security techniques. An example of an assurance level II electronic appliance 61B might be a general purpose personal computer equipped with a hardware integrated circuit secure processing unit ("SPU") that performs some secure processing outside of the SPU (see Ginter et al. patent disclosure FIG. 10 and associated text). Such a hybrid arrangement might be relatively more resistant to tampering than a software-only implementation.

The assurance level III appliance 61C shown is a general purpose personal computer equipped with a hardware-based secure processing unit 132 providing and completely containing protected processing environment 108 (see Ginter et al. FIGS. 6 and 9 for example). A silicon-based special purpose integrated circuit security chip is relatively more tamper-resistant than implementations relying on software techniques for some or all of their tamper-resistance.

In this example, verifying authority 100 digitally signs load modules 54 using different digital signature techniques (for example, different "private" keys 122) based on assurance level. The digital signatures 106 applied by verifying authority 100 thus securely encode the same (or different) load module 54 for use by appropriate corresponding assurance level electronic appliances 61.

Assurance level in this example may be assigned to a particular protected processing environment 108 at initialization (e.g., at the factory in the case of hardware-based secure processing units). Assigning assurance level at initialization time facilitates the use of key management (e.g., secure key exchange protocols) to enforce isolation based on assurance level. For example, since establishment of assurance level is done at initialization time, rather than in the field in this example, the key exchange mechanism can be used to provide new keys (assuming an assurance level has been established correctly).

Within a protected processing environment 108, as shown in FIGS. 10A–10C, different assurance levels may be assigned to each separate instance of a channel (see Ginter et al., FIG. 15) contained therein. In this way, each secure processing environment and host event processing environment (see Ginter et al., FIG. 10 and associated description) contained within an instance of a PPE 108 may contain multiple instances of a channel, each with independent and different assurance levels. The nature of this feature of the invention permits the separation of different channels within a PPE 108 from each other, each channel possibly having identical, shared, or independent sets of load modules for each specific channel limited solely to the resources and services authorized for use by that specific channel. In this way, the security of the entire PPE is enhanced and the effect of security breaches within each channel is compartmentalized solely to that channel.

As shown in FIGS. 11A–11C, different digital signatures and/or signature algorithms corresponding to different "assurance levels" may be used to allow a particular execution environment to protect itself from particular load modules 54 that are accessible to other classes or "assurance levels" of electronic appliances. As shown in FIGS. 11A–11C:

A protected processing environment(s) of assurance level I protects itself (themselves) by executing only load modules 54 sealed with an assurance level I digital signature 106(I). Protected processing environment(s) 108 having an associated assurance level I is (are) securely issued a public key 124(I) that can "unlock" the level I digital signature.

Similarly, a protected processing environment(s) of assurance level II protects itself (themselves) by executing only the same (or different) load module 54 sealed with a "Level II" digital signature 106(II). Such a protected processing environment 108 having an associated corresponding assurance level II possess a public key 124(II) used to "unlock" the level II digital signature.

A protected processing environment(s) 108 of assurance level III protects itself (themselves) by executing only load modules 54 having a digital signature 106(III) for assurance level III. Such an assurance level III protected processing environment 108 possesses a corresponding assurance level 3 public key 124(III). Key management encryption (not signature) keys can allow this protection to work securely.

In this example, electronic appliances 61 of different assurance levels can communicate with one another and pass load modules 54 between one another—an important feature providing a scaleable virtual distribution environment involving all sorts of different appliances ( e.g., personal computers, laptop computers, handheld computers, television sets, media players, set top boxes, internet browser appliances, smart cards, mainframe computers, etc.) The present invention uses verifying authority 100 and the digital signatures it provides to compartmentalize the different electronic appliances depending on their level of security (e.g., work factor or relative tamper resistance). In particular, verifying authority 100 and the digital signatures it provides isolate appliances with significantly different work factors—preventing the security of high work factor appliances from collapsing into the security of low work factor appliances due to free exchange of load modules 54.

In one example, verifying authority 100 may digitally sign identical copies of load module 54 for use by different classes or "assurance levels" of electronic appliances 61. If the sharing of a load module 54 between different electronic appliances is regarded as an open communications channel between the protected processing environments 108 of the two appliances, it becomes apparent that there is a high degree of risk in permitting such sharing to occur. In particular, the extra security assurances and precautions of the more trusted environment are collapsed into the those of the less trusted environment because an attacker who compromises a load module within a less trusted environment is then be able to launch the same load module to attack the more trusted environment. Hence, although compartmentalization based on encryption and key management can be used to restrict certain kinds of load modules 54 to execute only on certain types of electronic appliances 61, a significant application in this context is to compartmentalize the different types of electronic appliances and thereby allow an electronic appliance to protect itself against load modules 54 of different assurance levels.

FIG. 12 emphasizes this isolation using the illustrative metaphor of desert islands. It shows how the assurance levels can be used to isolate and compartmentalize any number of different types of electronic appliances 61. In this example:

Personal computer 60(1) providing a software-only protected processing environment 108 may be at assurance level I;

Media player 400(1) providing a software-only based protected processing environment may be at assurance level II;

Server 402(1) providing a software-only based protected processing environment may be at assurance level III;

Support service 404(1) providing a software-only based protected processing environment may be at assurance level IV;

Personal computer 60(2) providing a hybrid software and hardware protected processing environment 108 may be at assurance level V;

Media player 400(2) providing a hybrid software and hardware protected processing environment may be at assurance level VI;

Server 402(2) providing a software and hardware hybrid protected processing environment may be at assurance level VII;

Support service 404(2) providing a software and hardware hybrid protected processing environment may be at assurance level VIII; and Personal computer 60(3) providing a hardware-only protected processing environment 108 may be at assurance level IX;

Media player 400(3) providing a hardware-only protected processing environment may be at assurance level X;

Server 402(3) providing a hardware-only based protected processing environment may be at assurance level XI;

Support service 404(3) providing a hardware-only based protected processing environment may be at assurance level XII.

In accordance with this feature of the invention, verifying authority 100 supports all of these various categories of digital signatures, and system 50 uses key management to distribute the appropriate verification keys to different assurance level devices. For example, verifying authority 100 may digitally sign a particular load module 54 such that only hardware-only based server(s) 402(3) at assurance level XI may authenticate it. This compartmentalization prevents any load module executable on hardware-only servers 402(3) from executing on any other assurance level appliance (for example, software-only protected processing environment based support service 404(1)).

To simplify key management and distribution, execution environments having significantly similar work factors can be classified in the same assurance level. FIG. 13 shows one example hierarchical assurance level arrangement. In this example, less secure "software only" protected processing environment 108 devices are categorized as assurance level I, somewhat more secure "software and hardware hybrid" protected processing environment appliances are categorized as assurance level II, and more trusted "hardware only" protected processing environment devices are categorized as assurance level III.

Figure 13A:
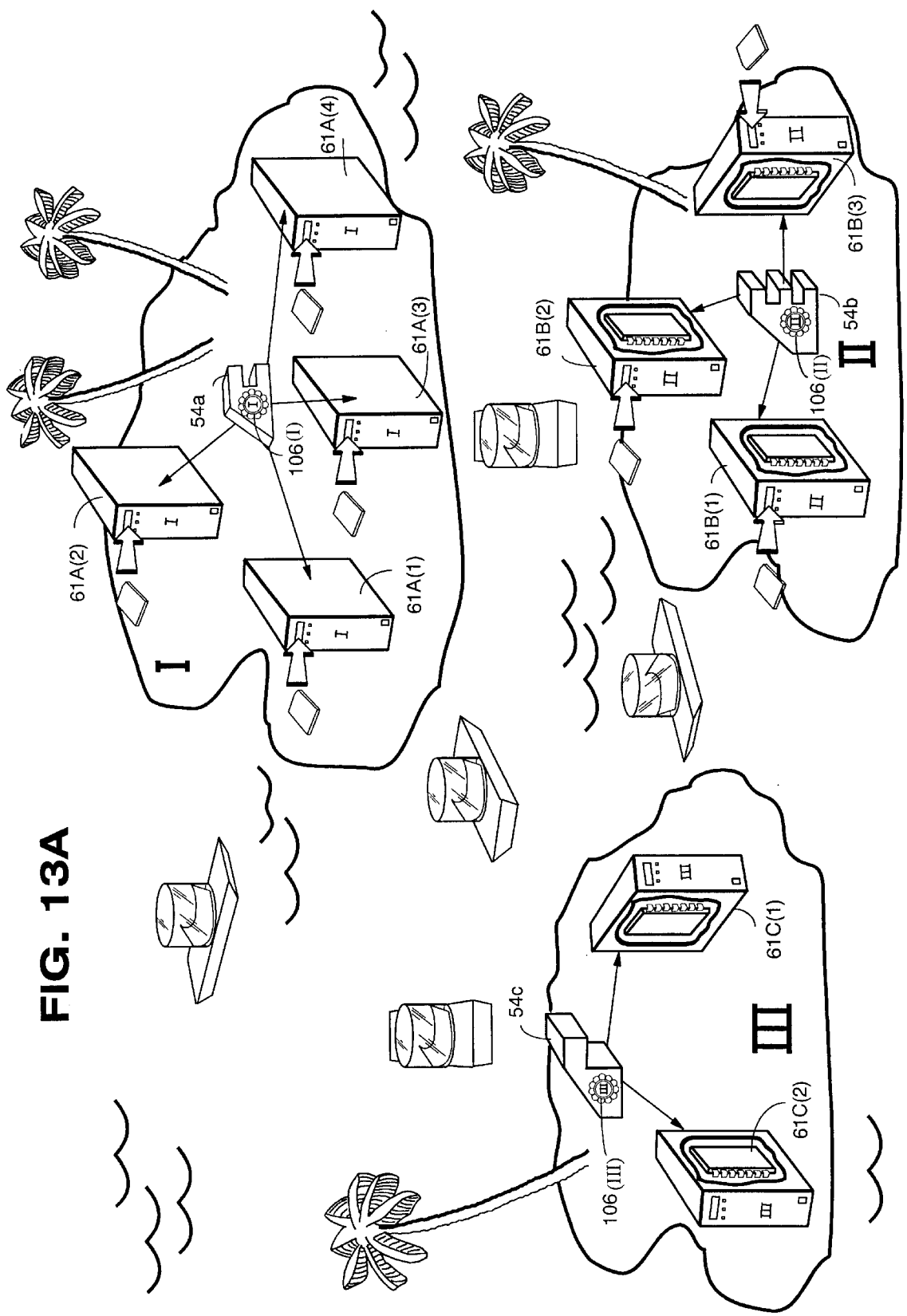

To show this type of isolation, FIG. 13A shows three example corresponding "desert islands." Desert island I is "inhabited" by personal computers 61A providing a software-only protected processing environment. The software-only protected processing environment based personal computers 60(1) "inhabit" desert island I are all of the same assurance level—and thus will each authenticate (and may thus each use) an assurance level I load module 54a. Desert island II is "inhabited" by assurance level II hybrid software and hardware protected processing environment personal computers 61B. These assurance level II personal computers will each authenticate (and may thus each execute) an assurance level II load module 54b. Similarly, a desert island III is "inhabited" by assurance level III personal computers 61C providing hardware-only protected processing environments. These assurance level III devices 61C may each authenticate and execute an assurance level III load module 54c.

The "desert islands" are created by the use of different digital signatures on each of load modules 54a, 54b, 54c. In this example, all of the appliances 61 may freely communicate with one another (as indicated by the barges—which represent electronic or other communications between the various devices. However, because particular assurance level load modules 54 will be authenticated only by appliances 60 having corresponding assurance levels, the load modules cannot leave their associated "desert island"—providing isolation between the different assurance level execution environments. More specifically, a particular assurance level appliance 61 thus protects itself from using a load module 54 of a different assurance level. Digital signatures (and/or signature algorithms) 106 in this sense create the isolated "desert islands" shown—since they allow execution environments to protect themselves from "off island" load modules 54 of different assurance levels.

A load module or other executable may be certified for multiple assurance levels. Different digital signatures may be used to certify the same load module or other executable for different respective assurance levels. The load module or other executable could also be encrypted differently (e.g. using different keys to encrypt the load module) based on assurance level. If a load module is encrypted differently for different assurance levels, and the keys and/or algorithms that are used to decrypt such load modules are only distributed to environments of the same assurance level, an additional measure of security is provided. The risk associated with disclosing the load module or other executable contents (e.g., by decrypting encrypted code before execution) in a lower assurance environment does not compromise the security of higher assurance level systems directly, but it may help the attacker learn how the load module or other executable works and how to encrypt them—which can be important in making bogus load modules or other executables (although not in certifying them—since certification requires keys that would only become available to an attacker who has compromised the keys of a corresponding appropriate assurance level environment). Commercially, it may be important for administrative ease and consistency to take this risk. In other cases, it will not be (e.g. provider sensitivities, government uses, custom functions, etc.)

Figure 14:
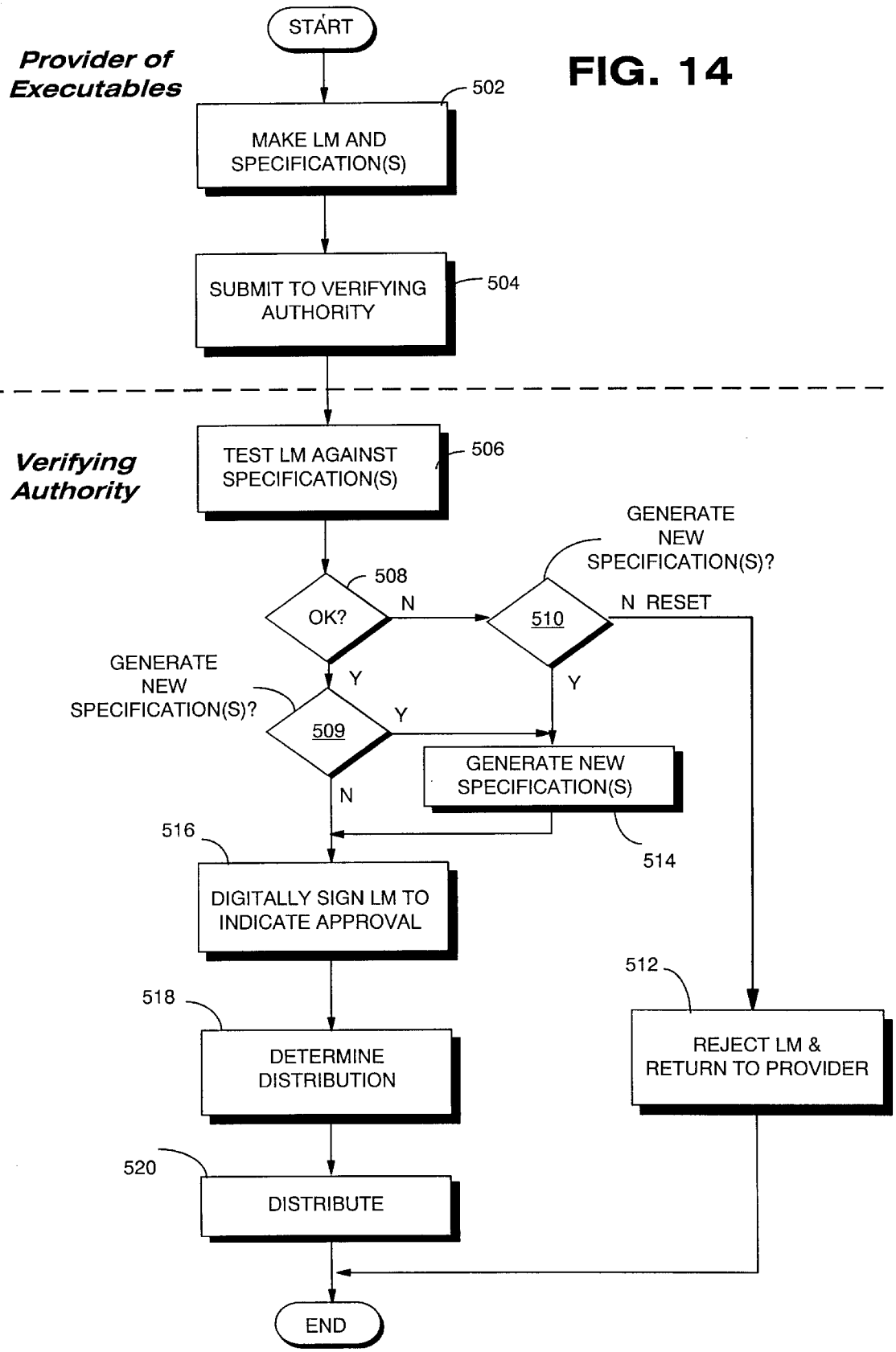
FIG. 14 shows example overall steps that may be performed within an electronic system (such as, for example, a virtual distribution environment) to test, certify, distribute and use executables.

FIG. 14 shows an example sequence of steps that may be performed in an overall process provided by these inventions. To begin the overall process, a load module provider 52 may manufacture a load module and associated specifications (FIG. 14, block 502). Provider 52 may then submit the load module and associated specifications to verifying authority 100 for verification (FIG. 14, block 504). Verifying authority 100 may analyze, test, and/or otherwise validate the load module against the specifications (FIG. 14, block 506), and determine whether the load module satisfies the specifications.

If the load module is found to satisfy its specifications, a verifying authority 100 determines whether it is authorized to generate one or more new specifications for the load module (FIG. 14, block 509). If it is authorized and this function has been requested ("Y" exit to decision block 509), a verifying authority generates specifications and associates them with the load module (FIG. 14, block 514).

If the load module fails the test ("N" exit to decision block 508), verifying authority 100 determines whether it is authorized and able to create new specifications corresponding to the actual load module performance, and whether it is desirable to create the conforming specifications (FIG. 14, decision block 510). If verifying authority 100 decides not to make new specifications ("N" exit to decision block 510), verifying authority returns the load module to provider 52 (block 512) and the process ends. On the other hand, if verifying authority 100 determines that it is desirable to make new specifications and it is able and authorized to do so, a verifying authority 100 may make new specifications that conform to the load module ("Y" exit to decision block 510; block 514).

A verifying authority 100 may then digitally sign the load module 54 to indicate approval (FIG. 14, block 516). This step 516 may involve applying multiple digital signatures and/or a selection of the appropriate digital signatures to use in order to restrict the load module to particular "assurance levels" of electronic appliances as discussed above. Verifying authority may then determine the distribution of the load module (FIG. 14, block 518). This "determine distribution" step may involve, for example, determining who the load module should be distributed to (e.g., provider 52, support services 404, a load module repository operated by a verifying authority, etc.) and/or what should be distributed (e.g., the load module plus corresponding digital signatures, digital signatures only, digital signatures and associated description, etc.). Verifying authority 100 may then distribute the appropriate information to a value chain using the appropriate distribution techniques (FIG. 14, block 520).

We claim:

1. A security method comprising:
   (a) digitally signing a first load module with a first digital signature designating the first load module for use by a first device class;
   (b) digitally signing a second load module with a second digital signature different from the first digital signature, the second digital signature designating the second load module for use by a second device class having at least one of tamper resistance and security level different from the at least one of tamper resistance and security level of the first device class;
   (c) distributing the first load module for use by at least one device in the first device class; and
   (d) distributing the second load module for use by at least one device in the second device class.

2. A method as in claim 1 further including the step of using the first and second digital signatures to prevent the tamper resistances or security levels of the first and second device classes from becoming equal.

3. A method as in claim 1 further including the step of conditionally executing, based at least in part on authenticating the first digital signature, the first load module with a first electronic appliance within the first device class.

4. A method as in claim 3 further including the step of conditionally executing, based at least in part on authenticating the second digital signature, the second load module with a second electronic appliance different from the first electronic appliance, the second electronic appliance being within the second device class.

5. A software verifying method comprising:
   (a) testing a load module having at least one specification associated therewith, the specification describing one or more functions performed by the load module;
   (b) verifying that the load module satisfies the specification; and
   (c) issuing at least one digital certificate attesting to the results of the verifying step.

6. A method of authenticating a load module comprising:
   (a) authenticating a first digital signature associated with some or all of the load module, including the step of employing a first one-way hash algorithm, a first decryption algorithm, and a first public key key, the first public key secured behind a tamper resistant barrier and therefore hidden from the user; and
   (b) authenticating a second digital signature associated with the same portion of the load module as the first digital signature is associated with, including the step of employing at least one of:
      (i) a second one-way hash algorithm that is different from the first one-way hash algorithm,
      (ii) a second decryption algorithm that is different from the first decryption algorithm, and
      (iii) a second public key that is different from the first public key.

7. A method as in claim 6 further including the step of randomly selecting one of step (a) and step (b) prior to executing the load module.

8. A method as in claim 6 wherein:
   (i) step (a) is performed by a first electronic appliance, and
   (ii) step (b) is performed by a second electronic appliance different from the first electronic appliance.

9. A method of distinguishing between trusted and untrusted load modules comprising:
   (a) receiving a load module,
   (b) determining whether the load module has an associated digital signature,
   (c) if the load module has an associated digital signature, authenticating the digital signature using at least one public key secured behind a tamper resistant barrier and therefore hidden from the user; and
   (d) conditionally executing the load module based at least in part on the results of authenticating step (c).

10. A method of increasing the security of a virtual distribution environment comprising plural interoperable protected processing environments having different security levels, the method comprising:
    (a) classifying the plural protected processing environments based on security level,
    (b) distributing different verification public keys to different protected processing environments having different security level classifications, and
    (c) using the distributed verification public keys to authenticate load modules, including the step of preventing protected processing environments having different security level classifications from executing the same load module.

11. A method as in claim 10 further including the step of maintaining the distributed verification public keys within tamper resistant barriers.

12. A method as in claim 10 further including the step of digitally signing each load module with at least two different, independent techniques.

13. A method as in claim 10 further including the step of testing whether the load module satisfies at least one specification describing one or more functions of the load module, and digitally signing the load module and the associated specification if the testing step reveals the specification is satisfied.

14. A first protected processing environment comprising:
    a first tamper resistant barrier having a first security level, and
    at least one arrangement within the first tamper resistant barrier that prevents the first protected processing environment from executing the same load module accessed by a second protected processing environment having a second tamper resistant barrier with a second security level different from the first security level.

15. A protected processing environment as in claim 14 wherein the preventing arrangement includes a digital signature authenticating circuit.

16. A protected processing environment as in claim 14 wherein the preventing arrangement includes first and second digital signature authenticating circuits applying different digital signature authenticating techniques.

17. A protected processing environment as in claim 14 wherein the preventing arrangement comprises means for randomly selecting between first and second, different digital signature authentication techniques.

18. A method for protecting a first computing arrangement surrounded by a first tamper resistant barrier having a first security level, the method including:
    preventing the first computing arrangement from using the same software module accessible by a second computing arrangement having a second tamper resistant barrier with a second security level different from the first security level.

19. A method as in claim 19 wherein the preventing step comprises:
authenticating at least one digital signature associated with the first computing arrangement as corresponding to the first security level.

20. A method of protecting computing arrangements comprising:
(a) associating plural digital signatures with a load module;
(b) authenticating a first subset of the plural digital signatures with a first tamper resistant computing arrangement; and
(c) authenticating a second subset of the plural digital signatures with a second tamper resistant computing arrangement different from the first computing arrangement.

21. A computer security method comprising:
digitally signing, using a first digital signing technique, a first executable designating the first executable for use by a first device class; and
digitally signing, using a second digital signing technique different from the first digital signing technique, a second executable designating the second executable for use by a second device class having at least one of tamper resistance and security level different from the at least one tamper resistance and security level of the first device class.

22. A method as in claim 21 further including the step of using the first and second digital signatures to prevent the tamper resistances or security levels of the first and second device classes from collapsing into one another.

23. A method as in claim 21 further including the step of conditionally executing the first executable based at least in part on authenticating the first executable with a first electronic appliance within the first device class.

24. A method as in claim 23 further including the step of conditionally executing the second executable with a second electronic appliance different from the first electronic appliance, the second electronic appliance being within the second device class.

25. A software verifying method comprising:
testing an executable having at least one specification associated therewith, the specification describing one or more functions of the load module;
verifying that the executable satisfies the specification; and
issuing at least one digital certificate attesting to the results of the verifying step.

26. A method of authenticating an executable comprising:
(a) authenticating a first digital signature associated with some or all of the executable, including the step of employing a first one-way hash algorithm, a first decryption algorithm, and a first public key, the first public key secured behind a tamper resistant barrier and therefore hidden from the user; and
(b) authenticating a second digital signature associated with the same portion of the executable as the first digital signature is associated with, including the step of employing at least one of:
(i) a second one-way hash algorithm that is different from the first one-way hash algorithm,
(ii) a second decryption algorithm that is different from the first decryption algorithm, and
(iii) a second public key that is different from the first public key.

27. A method as in claim 26 further including the step of randomly selecting one of step (a) and step (b) prior to executing the executable.

28. A method as in claim 26 wherein:
(i) step (a) is performed by a first electronic appliance, and
(ii) step (b) is performed by a second electronic appliance different from the first electronic appliance.

29. A method of distinguishing between trusted and untrusted executables comprising:
(a) receiving a executable,
(b) determining whether the executable has an associated digital signature,
(c) if the executable has an associated digital signature, authenticating the digital signature using at least one public key secured behind a tamper resistant barrier and therefore hidden from the user; and
(d) conditionally executing the executable based at least in part on the results of authenticating step (c).

30. A method of increasing the security of plural interoperable secure execution spaces having different security levels, the method comprising:
(a) classifying the plural secure execution spaces based on security level,
(b) distributing different verification public keys to different secure execution spaces having different security level classifications, and
(c) using the distributed verification public keys to authenticate executables, including the step of preventing secure execution spaces having different security level classifications from executing the same executable.

31. A method as in claim 30 further including the step of maintaining the distributed verification public keys within tamper resistant enclosures.

32. A method as in claim 30 further including the step of digitally signing each executable with at least two different, independent techniques or by different verifying authorities.

33. A method as in claim 30 further including the step of testing whether the executable satisfies at least one specification at least in part describing the executable operation, and digitally signing the executable and associated specification if the testing step reveals the executable satisfies the specification.

34. A protected processing environment comprising:
a first tamper resistant barrier having a first security level,
a first secure execution space, and
at least one arrangement within the first tamper resistant barrier that prevents the first secure execution space from executing the same executable accessed by a second secure execution space having a second tamper resistant barrier with a second security level different from the first security level.

35. A secure execution space as in claim 34 wherein the preventing arrangement includes a digital signature authenticating circuit.

36. A secure execution space as in claim 35 wherein the preventing arrangement includes first and second digital signature authenticating circuits applying different digital signature authenticating techniques.

37. A secure execution space as in claim 34 wherein the preventing arrangement comprises means for randomly selecting between first and second, different digital signature authentication techniques.

38. A method for protecting a first computing arrangement surrounded by a first tamper resistant barrier having a first security level, the method including:

preventing the first computing arrangement from using the same software module accessed by a second computing arrangement having a second tamper resistant barrier with a second security level different from the first security level.

39. A method as in claim 38 wherein the preventing step comprises authenticating at least one digital signature associated with the first computing arrangement as corresponding to the first security level.

40. A method of protecting computing arrangements comprising:

(a) associating plural digital signatures with an executable;

(b) authenticating a first subset of the plural digital signatures with a first tamper resistant computing arrangement; and (c) authenticating a second subset of the plural digital signatures with a second tamper resistant computing arrangement different from the first environment.

41. A method as in claim 40 wherein the associating step (a) comprises digitally signing the executable with first and second, different verifying authorities within a web of trust.

* * * * *

UNITED STATES PATENT AND TRADEMARK OFFICE
CERTIFICATE OF CORRECTION

PATENT NO.    : 6,157,721
DATED         : December 5, 2000
INVENTOR(S)   : Victor H. Shear, W. Olin Sibert and David M. Van Wie It is certified that error appears in the above-identified patent and that said Letters Patent is hereby corrected as shown below:

Column 21,
Line 52, "a first public key key" should read -- a first public key --.

Column 23,
Line 4, "claim 19" should read -- claim 18 --.

Column 24,
Line 12, "a executable" should read -- an executable --.

Signed and Sealed this

Twenty-seventh Day of May, 2003

JAMES E. ROGAN
*Director of the United States Patent and Trademark Office*